United States Patent
Biatek et al.

(10) Patent No.: US 11,115,658 B2
(45) Date of Patent: Sep. 7, 2021

(54) MATRIX INTRA PREDICTION AND CROSS-COMPONENT LINEAR MODEL PREDICTION HARMONIZATION FOR VIDEO CODING

(71) Applicant: QUALCOMM Incorporated, San Diego, CA (US)

(72) Inventors: Thibaud Laurent Biatek, Versailles (FR); Geert Van der Auwera, Del Mar, CA (US); Adarsh Krishnan Ramasubramonian, Irvine, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/893,974

(22) Filed: Jun. 5, 2020

(65) Prior Publication Data

US 2020/0413049 A1   Dec. 31, 2020

Related U.S. Application Data

(60) Provisional application No. 62/866,454, filed on Jun. 25, 2019, provisional application No. 62/872,607, filed on Jul. 10, 2019.

(51) Int. Cl.
*H04N 7/18* (2006.01)
*H04N 19/11* (2014.01)
(Continued)

(52) U.S. Cl.
CPC .......... *H04N 19/11* (2014.11); *H04N 19/105* (2014.11); *H04N 19/132* (2014.11);
(Continued)

(58) Field of Classification Search
CPC ...... H04N 19/11; H04N 19/59; H04N 19/176; H04N 19/70; H04N 19/159; H04N 19/105; H04N 19/132; H04N 19/186
(Continued)

(56) References Cited

U.S. PATENT DOCUMENTS

| 2015/0003529 A1* | 1/2015 | Thirumalai | H04N 19/70 375/240.14 |
| 2015/0016512 A1* | 1/2015 | Pu | H04N 19/147 375/240.03 |
| 2016/0182913 A1* | 6/2016 | Joshi | H04N 19/139 375/240.08 |

OTHER PUBLICATIONS

Zhang et al, Improving chroma intra prediction for HEVC (Year: 2016).*
(Continued)

*Primary Examiner* — Shan E Elahi
(74) *Attorney, Agent, or Firm* — Shumaker & Sieffert, P.A.

(57) ABSTRACT

A method of decoding video data includes predicting luma samples for a block of the video data using matrix intra prediction (MIP), where using MIP comprises down-sampling a set of luma neighboring samples to generate down-sampled luma neighboring samples. The method further includes predicting chroma samples for the block using cross-component linear model (CCLM) prediction, where using CCLM prediction comprises predicting the chroma samples for the block based on the down-sampled luma neighboring samples generated from the MIP. The method further includes determining a prediction block for the block based on the luma samples and the chroma samples, decoding a residual block for the block, and combining the prediction block and the residual block to decode the block.

26 Claims, 13 Drawing Sheets

(51) Int. Cl.
| | |
|---|---|
| H04N 19/59 | (2014.01) |
| H04N 19/176 | (2014.01) |
| H04N 19/70 | (2014.01) |
| H04N 19/159 | (2014.01) |
| H04N 19/105 | (2014.01) |
| H04N 19/132 | (2014.01) |
| H04N 19/186 | (2014.01) |
| H04N 19/91 | (2014.01) |
| H04N 19/167 | (2014.01) |
| H04N 19/61 | (2014.01) |
| H04N 19/23 | (2014.01) |
| H04N 19/136 | (2014.01) |
| G06T 3/40 | (2006.01) |
| G06T 7/50 | (2017.01) |

(52) U.S. Cl.
CPC ......... *H04N 19/159* (2014.11); *H04N 19/176* (2014.11); *H04N 19/186* (2014.11); *H04N 19/59* (2014.11); *H04N 19/70* (2014.11); *G06T 3/40* (2013.01); *G06T 7/50* (2017.01); *H04N 19/136* (2014.11); *H04N 19/167* (2014.11); *H04N 19/23* (2014.11); *H04N 19/61* (2014.11); *H04N 19/91* (2014.11)

(58) Field of Classification Search
USPC .................................................... 375/240.12
See application file for complete search history.

(56) References Cited

OTHER PUBLICATIONS

Deshpande et al., On Gradual and Clean Random Access (Year: 2019).*

Biatek, T. et al., "Harmonized MIP/CCLM Boundary Downsampling", JVET-O673-v4, Joint Video Experts Team (JVET) of ITU-T SG 16 WP 3 and ISO/IEC JTC 1/SC 29/WG 11, 15th Meeting: Gothenburg, SE, Jul. 3-12, 2019, pp. 1-7.

Bossen F., et al., "JVET Common Test Conditions and Software Reference Configurations for SDR Video", Joint Video Experts Team (JVET) of ITU-T SG 16 WP 3 and ISO/IEC14 UTC 1/5C 29/WG 11, 14th Meeting: Geneva, CH, Mar. 19-27, 2019, JVET-N1010-v1, pp. 1-6.

Bross B., et al., "Versatile Video Coding (Draft 5)", 14. JVET Meeting, Mar. 19, 2019-Mar. 27, 2019, Geneva, (The Joint Video Exploration Team of ISO/IEC JTC1/SC29/WG11 and ITU-T SG.16), No. JVET-N1001-v10, Jun. 11, 2019 (Jun. 11, 2019), XP030205561, pp. 1-408, Retrieved from the Internet: URL:http://phenix.int-evry.fr/jvet/doc_end_user/documents/14_Geneva/wg11/JVET-N1001-v10.zip JVET-N1001-v10.docx [retrieved on Jun. 11, 2019] abstract section 2, sections 7.3.2.4 and 7.4.3.4, section 7.3.7.5, section 7.3.7.10.

Bross et al., "Versatile Video Coding (Draft 5)", Joint Video Experts Team (JVET) of ITU-T SG 16 WP 3 and ISO/IEC14 UTC 1/5C 29/WG 11, 14th Meeting: Geneva, CH, Mar. 19-27, 2019, JVET-N1001-v8, 399 Pages.

Bross et al., "Versatile Video Coding (Draft 9)", Joint Video Experts Team (JVET) of ITU-T SG 16 WP 3 and ISO/IEC JTC 1/SC 29/WG 11, 18th Meeting: by teleconference, Apr. 15-24, 2020, Document: JVET-R2001-v8, 528 Pages.

Chen J, et al., "Algorithm Description for Versatile Video Coding and Test Model 5 (VTM 5)", 126. MPEG Meeting; Mar. 19, 2019-Mar. 27, 2019; Geneva; (Motion Picture Expert Group or ISO/I EC JTC1/SC29/WG11), JVET-N1002-v2, No. m48054, Jun. 11, 2019 (Jun. 11, 2019), XP030212630, Retrieved from the Internet: URL: http://phenix.int-evry.fr/mpeg/doc_end_user/documents/126_Geneva/wg11/m48054-JVET-N1002-v2-JVET-N1002-v2.zip JVET-N1002-v2.docx, [retrieved on Jun. 11, 2019], Section 3.4.8; Section 3.4.12 , 76 pages.

Chen J., et al., "Algorithm Description of Joint Exploration Test Model 1," 1, JVET Meeting, Oct. 19-21, 2015, Geneva;(The Joint Video Exploration Team of ISO/IEC JTC1/SC29/WG11 and ITU-T SG.16 ); URL: http://phenix.int-evry.fr/jvet/ ,, No. JVET-A1001 Feb. 24, 2016 (Feb. 24, 2016), XP030150000, 27 pages.

Chen J., et al., "JVET-G1001: Algorithm Description of Joint Exploration Test Model 7 (JEM7)", JVET-G1001-V1, Joint Video Exploration Team (JVET)of ITU-T SG 16 WP 3 and ISO/IEC JTC 1/SC 29/WG 11, 7th Meeting, Jul. 13, 2017-Jul. 21, 2017, Torino, Aug. 19, 2017 (Aug. 19, 2017), 51 Pages, XP030150980, pp. i-iv, Retrieved from the Internet: URL: http://phenix.int-evry.fr/jvet/doc_end_user/documents/7_Torino/wg11/JVET-G0001-v1.zip, p. 20, Paragraph 2.3.7—p. 23, Paragraph 2.3.7.6, p. 17, Paragraph 2.3.5—p. 18, section 2, sections 2.1.1. 2.3.1.

Chen Y., et al., "Description of SDR, HDR and 360 Degree Video Coding Technology Proposal by Qualcomm and Technicolor-Low and High Complexity Versions," JVET-J0021, 10th Meeting; San Diego, US, Apr. 10-20, 2018, (The Joint Video Exploration Team of ISO/IEC JTC1/SC29/WG11 and ITU-T SG.16); URL: http://phenix.int-evry.fr/jvet, pp. 1-43.

Segall A., et al., "JVET Common Test Conditions and Evaluation Procedures for HDR/WCG Video", Joint Video Experts Team (JVET) of ITU-T SG 16 WP 3 and ISO/IEC JTC 1/SC 29/WG 11, 14th Meeting: Geneva, CH, Mar. 19-27, 2019, Document: JVET-N1011, pp. 1-9.

Hanhart, P. et al., "CE3: Modified CCLM Downsampling Filter for "type-2" Content (Test 2.4)", JVET-M0142-v3, Joint Video Experts Team (JVET) of ITU-T SG 16 WP 3 and ISO/IEC JTC 1/SC 29/WG 11, 13th Meeting, Marrakech, MA, Jan. 9-18, 2019, pp. 1-5.

ITU-T H.265, "Series H: Audiovisual and Multimedia Systems, Infrastructure of Audiovisual Services—Coding of Moving Video, High efficiency Video Coding," The International Telecommunication Union, Dec. 2016, 664 Pages.

Pfaff J., et al., "CE3: Affine Linear Weighted Intra Prediction (CE3-4.1, CE3-4.2)," The Joint Video Exploration Team of ISO/IEC JTC1/SC29/WG11 14. JVET Meeting; Mar. 19, 2019-Mar. 27, 2019, Geneva, No. JVET-N0217, Mar. 12, 2019 (Mar. 12, 2019), XP030255495, 17 pages, Retrieved from the Internet: URL: http://phenix.int-evry.fr/jvet/doc_end_user/documents/14_Geneva/wg11/JVET-N0217-v1.zip JVET-N0217_v1.docx [retrieved on Mar. 12, 2019] cited in the application, sections 1.1-1.10.

Deshpande, S. "On Gradual and Clean Random Access", JVET-N0101, Joint Video Experts Team (JVET) of ITU-T SG 16 WP 3 and ISO/IEC JTC 1/SC 29/WG 11, 14th Meeting: Geneva, CH, Mar. 19-27, 2019, pp. 1-14.

* cited by examiner

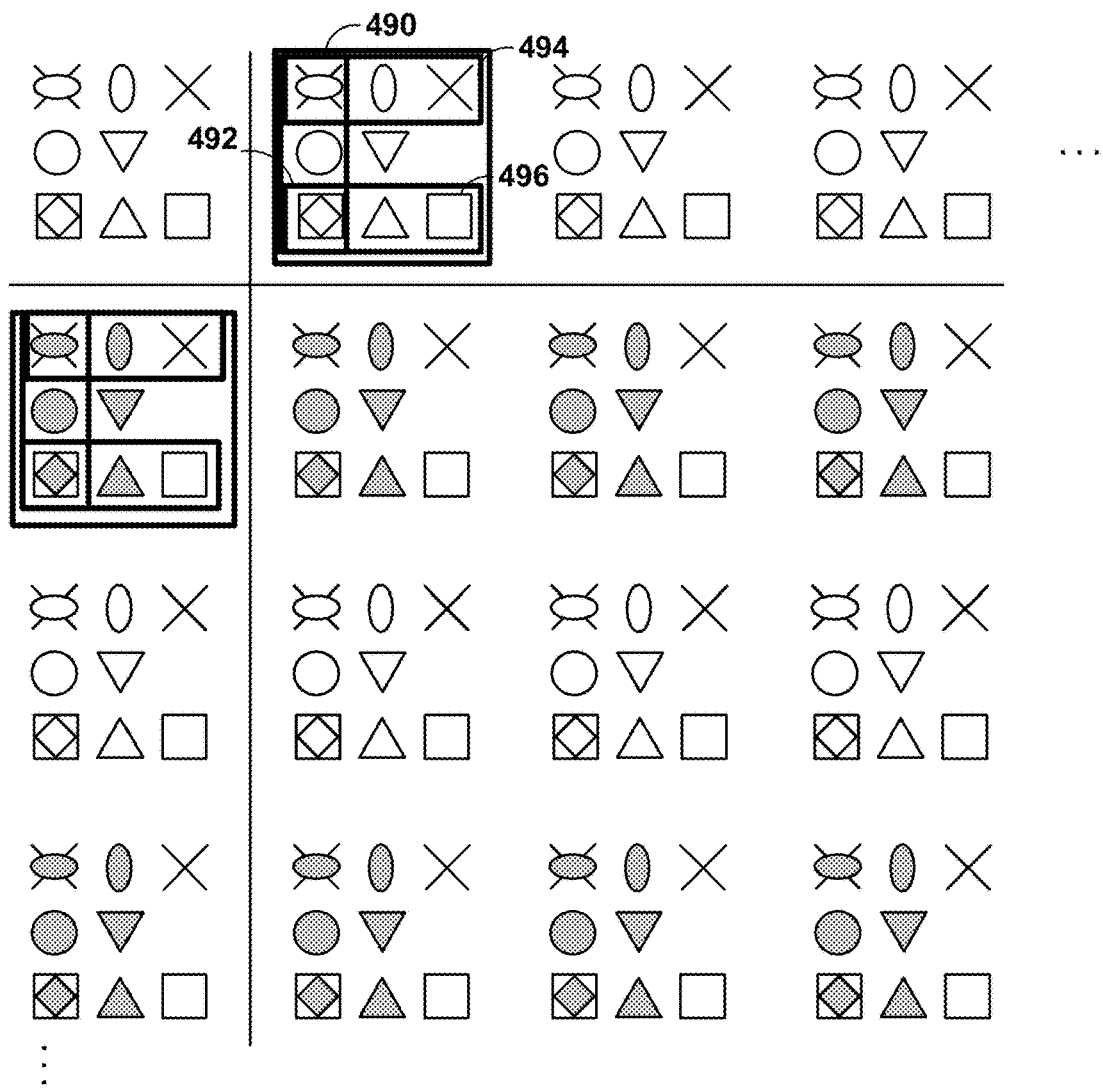

Interpretation of symbols

Luma sample position indications:

✕ Luma sample top field          ☐ Luma sample bottom field

Chroma sample position indications, where gray fill indicates a
bottom field sample type and no fill indicates a top field sample type:

⋈ Chroma sample type 2          0 Chroma sample type 3

○ Chroma sample type 0          ▽ Chroma sample type 1

⊠ Chroma sample type 4          △ Chroma sample type 5

FIG. 9

MATRIX INTRA PREDICTION AND CROSS-COMPONENT LINEAR MODEL PREDICTION HARMONIZATION FOR VIDEO CODING

This application claims the benefit of U.S. Provisional Application No. 62/866,454, filed Jun. 25, 2019, and U.S. Provisional Application No. 62/872,607, filed Jul. 10, 2019, each of which is incorporated by reference in its entirety.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for performing matrix intra prediction (MIP), which may be used to predict luma samples, and techniques for cross-component linear model (CCLM) prediction, which may be used to predict chroma samples, when encoding and decoding video data. Techniques described herein may use down-sampling techniques and/or down-sampled luma neighboring samples for both MIP and CCLM prediction. For example, a video coder (e.g., a video encoder and/or a video decoder) may apply MIP to predict luma samples for a block of video data using a down-sampling technique to determine down-sampled luma neighboring samples. In this example, the video coder may apply CCLM prediction to predict chroma samples for the same block using the down-sampling technique used for MIP to determine down-sampled luma neighboring samples. In some examples, the video coder may apply CCLM prediction to predict chroma samples for the same block using the down-sampled luma neighboring samples used for MIP. For instance, the video coder may use the down-sampled neighboring samples used in MIP prediction to derive CCLM parameters (e.g., an $\alpha$ parameter or a $\beta$ parameter), which are used to predict the chroma samples. The $\alpha$ parameter may represent a slope of a linear model for CCLM prediction and the $\beta$ may represent an intercept (e.g., an offset) of the linear model for CCLM prediction. In this way, the video coder may use the down-sampled luma neighboring samples for both MIP and CCLM prediction, which may reduce a number of times that the down-sampled luma neighboring samples are generated. Configuring a video coder to use down-sampled luma neighboring samples for both MIP and CCLM prediction may help to reduce a complexity of the video coder compared to video coders that do not use down-sampled luma neighboring samples for both MIP and CCLM prediction.

In one example, a method of decoding video data includes: predicting, by one or more processors implemented in circuitry, luma samples for a block of the video data using matrix intra prediction (MIP), wherein using MIP comprises down-sampling a set of luma neighboring samples to generate down-sampled luma neighboring samples; predicting, by the one or more processors, chroma samples for the block using cross-component linear model (CCLM) prediction, wherein using CCLM prediction comprises predicting the chroma samples for the block based on the down-sampled luma neighboring samples generated from the MIP; generating, by the one or more processors, a prediction block for the block based on the luma samples and the chroma samples; decoding, by the one or more processors, a residual block for the block; and combining, by the one or more processors, the prediction block and the residual block to decode the block.

In another example, a method of encoding video data includes: predicting, by one or more processors implemented in circuitry, luma samples for a block of the video data using matrix intra prediction (MIP), wherein using MIP comprises down-sampling a set of luma neighboring samples to generate down-sampled luma neighboring samples; predicting, by the one or more processors, chroma samples for the block using cross-component linear model (CCLM) prediction, wherein using CCLM prediction comprises predicting the chroma samples for the block based on the down-sampled luma neighboring samples generated from the MIP; generating, by the one or more processors, a prediction block for the block based on the luma samples and the chroma samples; generating, by the one or more processors, a residual block for the block based on differences between the block and the prediction block; and encoding, by the one or more processors, the residual block.

In another example, a device for decoding video data includes: a memory configured to store the video data; and one or more processors implemented in circuitry and configured to: predict luma samples for a block of the video data using matrix intra prediction (MIP), wherein, to predict the luma samples using MIP, the one or more processors are configured to down-sample a set of luma neighboring samples to generate down-sampled luma neighboring samples; predict chroma samples for the block using cross-component linear model (CCLM) prediction, wherein, to predict the chroma samples using CCLM prediction, the one or more processors are configured to predict the chroma samples for the block based on the down-sampled luma neighboring samples generated from the MIP; generate a prediction block for the block based on the luma samples and the chroma samples; decode a residual block for the block; and combine the prediction block and the residual block to decode the block.

In one examples, a device for encoding video data includes: a memory configured to store video data; and one or more processors implemented in circuitry and configured to: predict luma samples for a block of the video data using matrix intra prediction (MIP), wherein, to predict the luma samples using MIP, the one or more processors are configured to down-sample a set of luma neighboring samples to generate down-sampled luma neighboring samples; predict chroma samples for the block using cross-component linear model (CCLM) prediction, wherein, to predict the chroma samples using CCLM prediction, the one or more processors are configured to predict the chroma samples for the block based on the down-sampled luma neighboring samples generated from the MIP; generate a prediction block for the block based on the luma samples and the chroma samples; generate a residual block for the block based on differences between the block and the prediction block; and encode the residual block In another example, a computer-readable storage medium is encoded with instructions that, when executed, cause a programmable processor to: predict luma samples for a block of video data using matrix intra prediction (MIP), wherein, to predict the luma samples using MIP, the one or more processors are configured to down-sample a set of luma neighboring samples to generate down-sampled luma neighboring samples; predict chroma samples for the block using cross-component linear model (CCLM) prediction, wherein, to predict the chroma samples using CCLM prediction, the one or more processors are configured to predict the chroma samples for the block based on the down-sampled luma neighboring samples generated from the MIP; generate a prediction block for the block based on the luma samples and the chroma samples; decode a residual block for the block; and combine the prediction block and the residual block to decode the block.

In another example, a computer-readable storage medium is encoded with instructions that, when executed, cause a programmable processor to: predict luma samples for a block of video data using matrix intra prediction (MIP), wherein, to predict the luma samples using MIP, the one or more processors are configured to down-sample a set of luma neighboring samples to generate down-sampled luma neighboring samples; predict chroma samples for the block using cross-component linear model (CCLM) prediction, wherein, to predict the chroma samples using CCLM prediction, the one or more processors are configured to predict the chroma samples for the block based on the down-sampled luma neighboring samples generated from the MIP; generate a prediction block for the block based on the luma samples and the chroma samples; generate a residual block for the block based on differences between the block and the prediction block; and encode the residual block.

In one example, an apparatus for decoding video data comprises: means for predicting luma samples for a block of the video data using matrix intra prediction (MIP), wherein using MIP comprises down-sampling a set of luma neighboring samples to generate down-sampled luma neighboring samples; means for predicting chroma samples for the block using cross-component linear model (CCLM) prediction, wherein using CCLM prediction comprises predicting the chroma samples for the block based on the down-sampled luma neighboring samples generated from the MIP; means for generating a prediction block for the block based on the luma samples and the chroma samples; means for decoding a residual block for the block; and means for combining the prediction block and the residual block to decode the block.

In one example, an apparatus for encoding video data comprises: means for predicting luma samples for a block of the video data using matrix intra prediction (MIP), wherein using MIP comprises down-sampling a set of luma neighboring samples to generate down-sampled luma neighboring samples; means for predicting chroma samples for the block using cross-component linear model (CCLM) prediction, wherein using CCLM prediction comprises predicting the chroma samples for the block based on the down-sampled luma neighboring samples generated from the MIP; means for generating a prediction block for the block based on the luma samples and the chroma samples; means for generating a residual block for the block based on differences between the block and the prediction block; and means for encoding the residual block.

The details of one or more examples are set forth in the accompanying drawings and the description below. Other features, objects, and advantages will be apparent from the description, drawings, and claims.

BRIEF DESCRIPTION OF DRAWINGS

FIG. 9 is a conceptual diagram illustrating grouping of downsampled luma samples to align with chroma samples.

DETAILED DESCRIPTION

Figure 1:
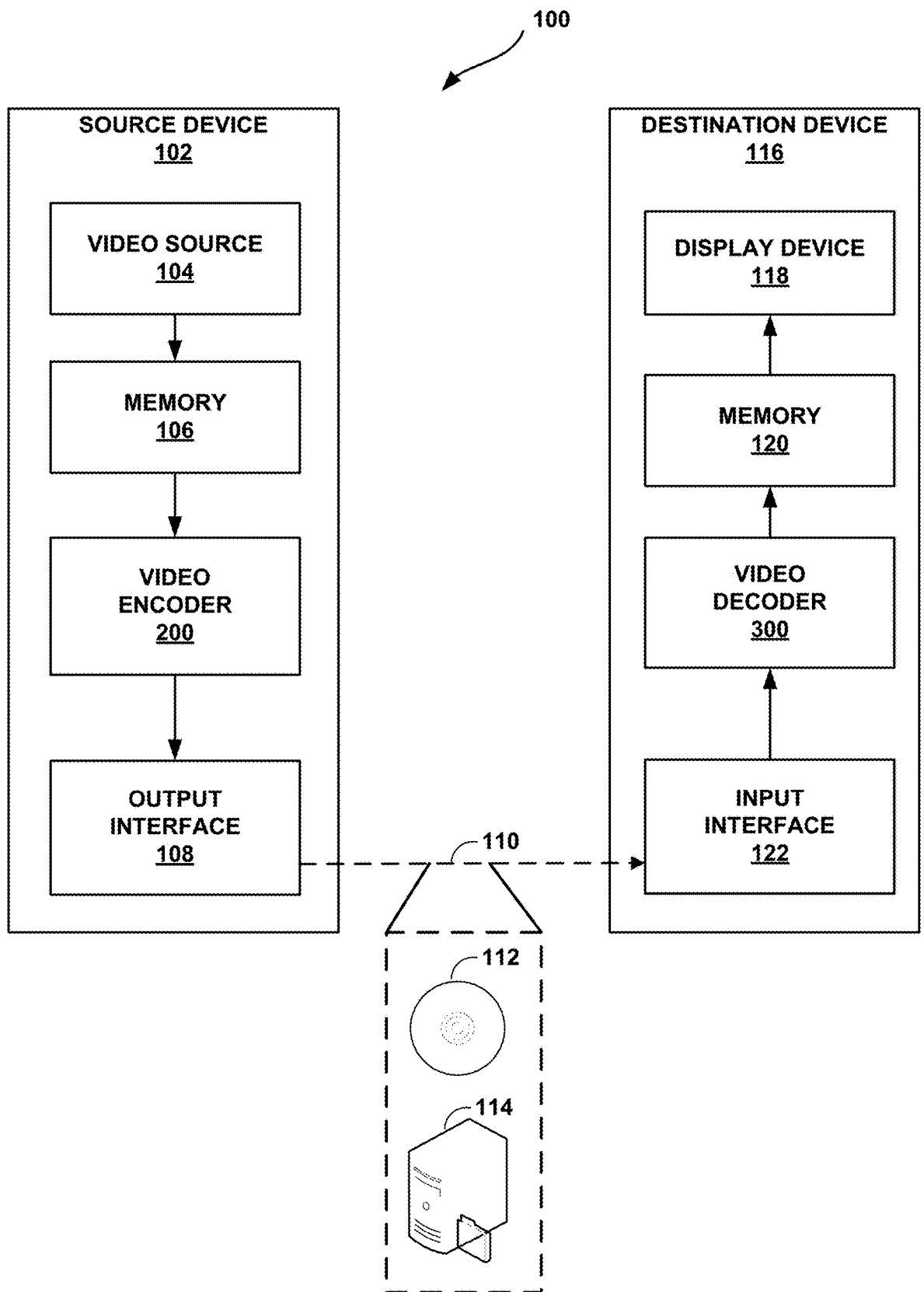
FIG. 1 is a block diagram illustrating an example video encoding and decoding system that may perform the techniques of this disclosure.

A video coder may (e.g., a video encoder or a video decoder) may predict luma samples using matrix intra prediction (MIP), which may also be referred to as "Affine linear weighted intra prediction." For example, the video coder may average pairs of neighboring luma samples of a left boundary of a block and a top boundary of the block to generate down-sampled luma neighboring samples. The video coder may apply a matrix-vector multiplication to the down-sampled luma neighboring samples to generate predicted luma samples for the block. In this way, luma samples may be predicted using a relatively low number of multiplications per sample, which may help to reduce a computational burden on the video coder.

A video coder (e.g., a video encoder or a video decoder) may also be configured to predict chroma samples using cross-component linear model (CCLM) prediction. For example, the video coder may calculate CCLM parameters (e.g., α and β parameters) using neighboring chroma samples and corresponding down-sampled luma neighboring samples. The α parameter may represent a slope of a linear model for CCLM prediction and the β may represent an intercept (e.g., an offset) of the linear model for CCLM prediction. The video coder may generate a linear model using the CCLM parameters and apply the linear model using reconstructed luma samples for the block to generate predicted chroma samples for the block. In this way, the video coder may reduce cross-component redundancy to improve an accuracy of prediction information while minimizing a number of multiplications.

However, a video coder may be configured to perform a first down-sampling technique for MIP to generate down-sampled luma neighboring samples used for MIP and then apply a second down-sampling technique for CCLM prediction to generate down-sampled luma neighboring samples used for CCLM. The first down-sampling technique for MIP and the second down-sampling technique for CCLM prediction may be different, which may rely on implementing two separate down-sampling techniques for generating down-sampled luma neighboring samples of a single block.

In accordance with the techniques of the disclosure, a video coder (e.g., a video encoder and/or video decoder) may be configured to predict chroma samples for a block based on down-sampled luma neighboring samples that were generated during MIP. For example, rather than down-sampling luma neighboring samples for MIP using a first down-sampling technique and again down-sampling the same luma neighboring samples for CCLM prediction using a second down-sampling technique different than the first down-sampling technique used for MIP, the video coder may apply CCLM prediction to predict chroma samples for the same block using the down-sampled luma neighboring samples used for MIP. In this way, the video coder may use a single down-sampling function to generate the down-sampled luma neighboring samples for both MIP and CCLM prediction. Configuring a video coder to use down-sampled luma neighboring samples for both MIP and CCLM prediction may help to reduce a complexity of the video coder compared to video coders that do not use down-sampled luma neighboring samples for both MIP and CCLM prediction.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for performing matrix intra prediction (MIP) and cross-component linear model (CCLM) prediction. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for performing MIP and CCLM prediction. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, devices 102, 116 may operate in a substantially symmetrical manner such that each of devices 102, 116 include video encoding and decoding components. Hence, system 100 may support one-way or two-way video transmission between video devices 102, 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories.

In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, computer-readable medium 110 may include storage device 112. Source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, computer-readable medium 110 may include file server 114 or another intermediate storage device that may store the encoded video data generated by source device 102. Source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as the Joint Exploration Test Model (JEM) or ITU-T H.266, also referred to as Versatile Video Coding (VVC). A draft of the VVC standard is described in Bross, et al. "Versatile Video Coding (Draft 5)," Joint Video Experts Team (JVET) of ITU-T SG 16 WP 3 and ISO/IEC JTC 1/SC 29/WG 11, 14$^{th}$ Meeting: Geneva, CH, 19-27 Mar. 2019, JVET-N1001-v8 (hereinafter "VVC Draft 5"). A more recent draft of the VVC standard is described in Bross, et al. "Versatile Video Coding (Draft 9)," Joint Video Experts Team (JVET) of ITU-T SG 16 WP 3 and ISO/IEC JTC 1/SC 29/WG 11, 18$^{th}$ Meeting: by teleconference, 15-24 Apr. 2020, JVET-R2001-v8 (hereinafter "VVC Draft 9"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

In accordance with the techniques of this disclosure, video encoder 200 and video decoder 300 may be configured to predict luma samples for a block of the video data using MIP, where using MIP comprises down-sampling a set of luma neighboring samples to generate down-sampled luma neighboring samples. Video encoder 200 or video decoder 300 may predict chroma samples for the block using CCLM prediction, where using CCLM prediction comprises predicting the chroma samples for the block based on the down-sampled luma neighboring samples generated from the MIP. Video encoder 200 or video decoder 300 may generate a prediction block for the block based on the luma samples and the chroma samples.

To predict a block, a video coder (e.g, video encoder 200 or video decoder 300) may apply MIP. For example, to apply MIP, the video coder may average pairs of neighboring luma samples of a left boundary of a block and of a top boundary of the block to generate down-sampled luma neighboring samples. The video coder may apply a matrix-vector multiplication to the down-sampled luma neighboring samples to generate predicted luma samples for the block. In this way, the video coder may predict luma samples for the block using a relatively low number of multiplications per sample, which may help to reduce a computational burden on the video coder compared to video coders that do not apply MIP.

The video coder (e.g., video encoder 200 or video decoder 300) may also be configured to predict chroma samples using CCLM prediction. For example, the video coder may calculate CCLM parameters (e.g., $\alpha$ and $\beta$ parameters) using neighboring chroma samples and corresponding down-sampled luma neighboring samples. The video coder may generate a linear model using the CCLM parameters and apply the linear model using reconstructed luma samples for the block to generate predicted chroma samples for the block. In this way, the video coder may reduce cross-component redundancy to improve an accuracy of prediction information.

In accordance with the techniques of the disclosure, a video coder (e.g., video encoder 200 or video decoder 300) may be configured to predict chroma samples for a block based on down-sampled luma neighboring samples that were generated during MIP. For example, rather than down-sampling luma neighboring samples for MIP and again down-sampling the same luma neighboring samples for CCLM prediction using a different down-sampling technique, the video coder may apply CCLM prediction to predict chroma samples for the same block using the down-sampled luma neighboring samples used for MIP. In this way, the video coder may use the down-sampled luma neighboring samples for both MIP and CCLM prediction. Configuring a video coder to use down-sampled luma neighboring samples for both MIP and CCLM prediction may help to reduce a complexity of the video coder compared to video coders that do not use down-sampled luma neighboring samples for both MIP and CCLM prediction.

Figure 2:
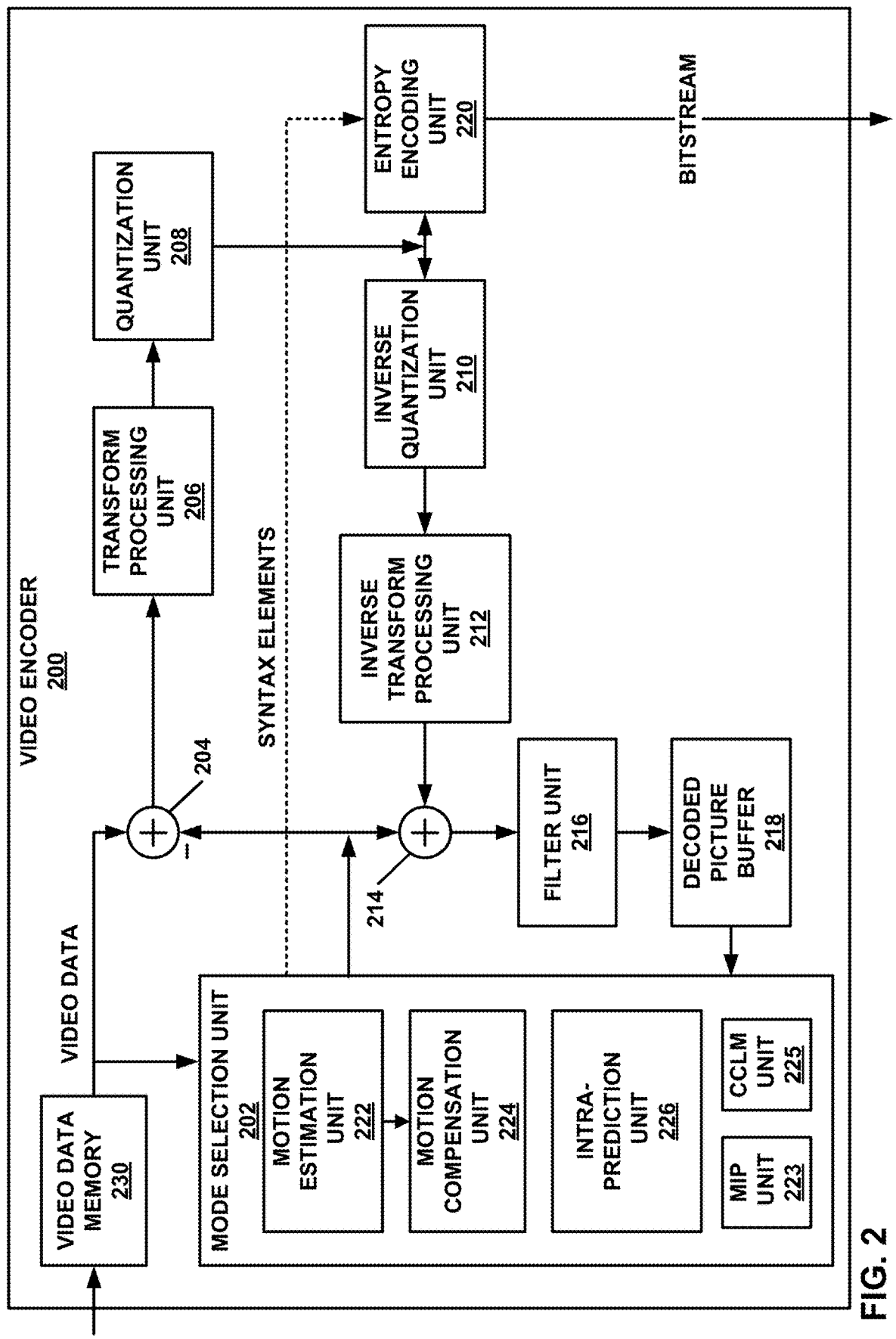
FIG. 2 is a block diagram illustrating an example video encoder that may perform the techniques of this disclosure.

FIG. 2 is a block diagram illustrating an example video encoder 200 that may perform the techniques of this disclosure. FIG. 2 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266/VVC video coding standard in development. However, the techniques of this disclosure are not limited to these video coding standards, and are applicable generally to video encoding and decoding.

In the example of FIG. 2, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

Figure 3:
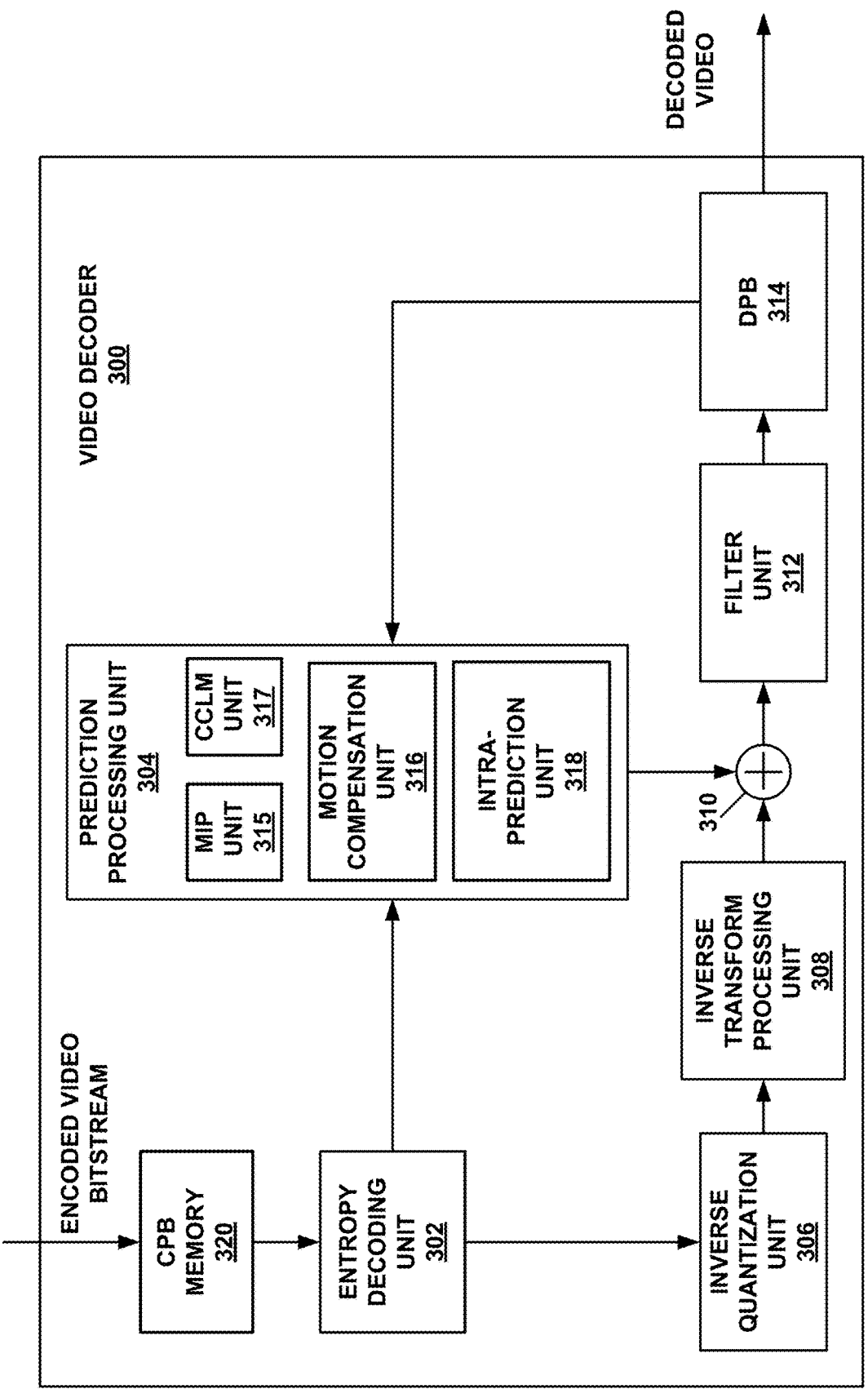
FIG. 3 is a block diagram illustrating an example video decoder that may perform the techniques of this disclosure.

The various units of FIG. 3 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Mode selection unit 202 may select whether to apply MIP for a block. For example, mode selection unit 202 may determine to apply MIP for the block based on a value representative of how similar a potential reference block is to the current block. Similarly, mode selection unit 202 may select whether to apply CCLM prediction for a block. For example, mode selection unit 202 may determine to apply CCLM prediction for the block based on a value representative of how similar a potential reference block is to the current block.

In accordance with one or more techniques described herein, MIP unit 223 may predict luma samples for a block of the video data using MIP when selecting to apply MIP to the block. In some examples, mode selection unit 202 may down-sample a set of luma neighboring samples to generate down-sampled luma neighboring samples. In this example, CCLM unit 225 may predict chroma samples for the block using CCLM prediction when selecting to apply CCLM prediction to the block. In some examples, CCLM unit 225 may predict the chroma samples for the block based on the down-sampled luma neighboring samples generated from MIP.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit does not further partition a CU into PUs, each CU may be associated with a luma coding block and corresponding chroma coding blocks. As above, the size of a CU may refer to the size of the luma coding block of the CU. The video encoder 200 and video decoder 120 may support CU sizes of 2N×2N, 2N×N, or N×2N.

For other video coding techniques such as an intra-block copy mode coding, an affine-mode coding, and linear model (LM) mode coding, as a few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying an MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to predict luma samples for a block of the video data using MIP, wherein using MIP comprises down-sampling a set of luma neighboring samples to generate down-sampled luma neighboring samples; predicting, by the one or more processors, chroma samples for the block using CCLM prediction, wherein using CCLM prediction comprises predicting the chroma samples for the block based on the down-sampled luma neighboring samples generated from the MIP; determining, by the one or more processors, a prediction block for the block based on the luma samples and the chroma samples; decoding, by the one or more processors, a residual block for the block; and combining, by the one or more processors, the prediction block and the residual block to decode the block.

FIG. 3 is a block diagram illustrating an example video decoder 300 that may perform the techniques of this disclosure. FIG. 3 is provided for purposes of explanation and is not limiting on the techniques as broadly exemplified and described in this disclosure. For purposes of explanation, this disclosure describes video decoder 300 according to the techniques of JEM, VVC, and HEVC. However, the techniques of this disclosure may be performed by video coding devices that are configured to other video coding standards.

In the example of FIG. 3, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 3 are illustrated to assist with understanding the operations performed by video decoder 300. The units may be implemented as fixed-function circuits, programmable circuits, or a combination thereof. Similar to FIG. 3, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 3).

Prediction processing unit 304 may select whether to apply MIP for a block. For example, prediction processing unit 304 may determine to apply MIP for the block based on one or more syntax values of syntax elements that were entropy decoded by entropy decoding unit 302. Similarly, prediction processing unit 304 may select whether to apply CCLM prediction for a block. For example, prediction processing unit 304 may determine to apply CCLM prediction for the block based on one or more syntax values of syntax elements that were entropy decoded by entropy decoding unit 302.

In accordance with one or more techniques described herein, MIP unit 315 may predict luma samples for a block of the video data using MIP when selecting to apply MIP to the block. In some examples, MIP unit 315 may down-sample a set of luma neighboring samples to generate down-sampled luma neighboring samples. In this example, CCLM unit 317 may predict chroma samples for the block using CCLM prediction when selecting to apply CCLM prediction to the block. In some examples, CCLM unit 317 may predict the chroma samples for the block based on the down-sampled luma neighboring samples generated from MIP.

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 2). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB 314 for subsequent presentation on a display device, such as display device 118 of FIG. 1.

Video decoder 300 represents an example of a device configured to decode video data including a memory configured to store video data, and one or more processing units implemented in circuitry and configured to predict luma samples for a block of the video data using MIP, wherein using MIP comprises down-sampling a set of luma neighboring samples to generate down-sampled luma neighboring samples; predict chroma samples for the block using CCLM prediction, wherein using CCLM prediction comprises predicting the chroma samples for the block based on the down-sampled luma neighboring samples generated from the MIP; determining, by the one or more processors, a prediction block for the block based on the luma samples and the chroma samples; decoding, by the one or more processors, a residual block for the block; and combining, by the one or more processors, the prediction block and the residual block to decode the block.

During the $14^{th}$ JVET meeting in Geneva, Switzerland, an affine linear weighted intra prediction (ALWIP) tool was adopted into the VVC Draft 5. The ALWIP tool is also referred to herein as matrix intra prediction (MIP). In this disclosure, the terms ALWIP and MIP may be used interchangeably. Techniques related to ALWIP will be described below. Additional information may be found at J. Pfaff, B. Stallenberger, M. Schafer, P. Merkle, P. Helle, T. Hinz, H. Schwarz, D. Marpe, T. Wiegand, "CE3: Affine linear weighted intra prediction," $14^{th}$ JVET Meeting, Geneva, Switzerland, March 2019, JVET-N0217.

For predicting the samples of a rectangular block of width W and height H, when using MIP, a video coder (e.g., video encoder 200 and/or video decoder 300) takes one line of H reconstructed neighbouring boundary samples left of the block and one line of W reconstructed neighbouring boundary samples above the block as input. If the reconstructed samples are unavailable, the video coder may generate the reconstructed sample using intra prediction.

When applying MIP, a video encoder (e.g., video encoder 200) may generate a prediction signal based on the following steps:

1. The video coder may extract out of the boundary samples (e.g., four samples in the case of W=H=4 and eight samples in all other cases) by averaging.

2. The video coder may carry out a matrix vector multiplication with the averaged samples as an input, followed by an addition of an offset. The result is a reduced prediction signal on a subsampled set of samples in the original block.

3. The video coder may generate the prediction signal at the remaining positions from the prediction signal on the subsampled set by linear interpolation, which may be a single step linear interpolation in each direction.

4. As matrix vector multiplication leads to out-of-range values, the video coder may perform a clipping operation on the full resolution prediction signal.

A video coder (e.g., video encoder 200 or video decoder 300) may take the matrices and offset vectors used to generate the prediction signal from three sets $S_0$, $S_1$, $S_2$ of matrices. The set $S_0$ includes 18 matrices $A_0^i$, $i \in \{0, \ldots, 17\}$, each of which has 16 rows, 4 columns, and 18 offset vectors $b_0^i$, $i \in \{0, \ldots, 17\}$, each of size 16. The video coder may use matrices and offset vectors of that set for blocks of size 4×4. The set $S_1$ may include 10 matrices $A_1^i$, $i \in \{0, \ldots, 9\}$, each of which has 16 rows, 8 columns, and 10 offset vectors $b_1^i$, $i \in \{0, \ldots, 9\}$, each of size 16. The video coder may use matrices and offset vectors of that set for blocks of sizes 4×8, 8×4 and 8×8. Finally, the set $S_2$ includes 6 matrices, $A_2^i$, $i \in \{0, \ldots, 5\}$, each of which has 64 rows, 8 columns, and of 6 offset vectors $b_2^i$, $i \in \{0, \ldots, 5\}$ of size 64. The video coder may use matrices and offset vectors of that set or parts of these matrices and offset vectors for all other block-shapes.

In this way, a video coder (e.g., video encoder 200 or video decoder 300) may be configured to apply MIP such that a total number of multiplications used in the computation of the matrix vector product is always smaller than or equal to 4 W H. In other words, at most four multiplications per sample are used for the ALWIP or MIP modes.

A video coder (e.g., video encoder 200 or video decoder 300) may be configured to perform averaging of the boundary when applying MIP and/or ALWIP. In a first step, the video coder may reduce the input boundaries $bdry^{top}$ and $bdry^{left}$ to smaller boundaries $bdry_{red}^{top}$ and $bdry_{red}^{left}$. Here, the video coder may be configured to generate $bdry_{red}^{top}$ and $bdry_{red}^{left}$ to both include two samples in the case of a 4×4-block and to both include four samples in all other cases.

In the case of a 4×4-block, for $0 \leq i < 2$, a video coder (e.g., video encoder 200 or video decoder 300) may define the boundary as:

$$bdry_{red}^{top}[i] = \left(\left(\sum_{j=0}^{1} bdry^{top}[i \cdot 2 + j]\right) + 1\right) \gg 1$$

and analogously define $bdry_{red}^{left}$. Otherwise, if the block-width W is given as $W=4 \cdot 2^k$, for $0 \leq i < 4$, the video coder may define the boundary as:

$$bdry_{red}^{top}[i] = \left(\left(\sum_{j=0}^{2^k-1} bdry^{top}[i \cdot 2^k + j]\right) + (1 \ll (k-1))\right) \gg k$$

and analogously define $bdry_{red}^{left}$.

A video coder (e.g., video encoder 200 or video decoder 300) may concatenate the two reduced boundaries $bdry_{red}^{top}$ and $bdry_{red}^{left}$ to a reduced boundary vector $bdry_{red}$, which is of size four for blocks of shape 4×4 and of size eight for blocks of all other shapes. If mode refers to the ALWIP-mode, the video coder may define this concatenation as follows:

$$bdry_{red} = \begin{cases} [bdry_{red}^{top}, bdry_{red}^{left}] & \text{for } W = H = 4 \text{ and mode} < 18 \\ [bdry_{red}^{left}, bdry_{red}^{top}] & \text{for } W = H = 4 \text{ and mode} \geq 18 \\ [bdry_{red}^{top}, bdry_{red}^{left}] & \text{for } \max(W, H) = 8 \text{ and mode} < 10 \\ [bdry_{red}^{left}, bdry_{red}^{top}] & \text{for } \max(W, H) = 8 \text{ and mode} \geq 10 \\ [bdry_{red}^{top}, bdry_{red}^{left}] & \text{for } \max(W, H) > 8 \text{ and mode} < 6 \\ [bdry_{red}^{left}, bdry_{red}^{topp}] & \text{for } \max(W, H) > 8 \text{ and mode} \geq 6. \end{cases}$$

Additionally, for the interpolation of the subsampled prediction signal for large blocks, a video coder (e.g., video encoder 200 or video decoder 300) may use a second version of the averaged boundary. For example, if min(W,H)>8 and W≥H, W=8*2$^l$, and, for 0≤i<8, the video code may define the boundary as:

$$bdry_{redII}^{top}[i] = \left(\left(\sum_{j=0}^{2^l-1} bdry^{top}[i \cdot 2^l + j]\right) + (1 \ll (l-1))\right) \gg l.$$

If min(W,H)>8 and H>W, the video coder may analogously define bdry$_{redII}^{left}$.

In examples of VVC the invoked down-sampling process is specified as follows. The following refers to a modified section of VVC Draft 5, however, such changes may be applied to other versions of VVC, other sections of VVC, and/or other processes.

8.4.5.2.3 MIP Boundary Sample Downsampling Process
Inputs to this process are:
a variable nTbS specifying the transform block size, reference samples refS[x] with x=0 . . . nTbS−1,
a variable boundarySize specifying the downsampled boundary size,
a flag needUpsBdry specifying whether intermediate boundary samples are required for upsampling,
a variable upsBdrySize specifying the boundary size for upsampling.

Outputs of this process are the reduced boundary samples redS[x] with x=0 . . . boundarySize−1 and upsampling boundary samples upsBdryS[x] with x=0 . . . upsBdrySize−1.

The upsampling boundary samples upsBdryS[x] with x=0 . . . upsBdrySize−1 are derived as follows:
If needUpsBdry is equal to TRUE and upsBdrySize is less than nTbS, the following applies:

uDwn=nTbS/upsBdrySize (8-75)

upsBdryS[x]=Σ$_{i=0}^{uDwn-1}$refs[x*uDwn+i]+(1<<(Log 2(uDwn)−1)))>>Log 2(uDwn) (8-76)

Otherwise (upsBdrySize is equal to nTbS), upsBdryS[x] is set equal to refS[x]. The reduced boundary samples redS[x] with x=0 . . . boundarySize−1 are derived as follows:
If boundarySize is less than upsBdrySize, the following applies:

bDwn=upsBdrySize/boundarySize (8-77)

redS[x]Σ$_{i=0}^{bDwn-1}$upsBdryS[x*bDwn+i]+(1<<(Log 2(bDwn)−1)))>>Log 2(bDwn) (8-78)

Otherwise (boundarySize is equal to upsBdrySize), redS [x] is set equal to upsBdryS[x].

A video coder (e.g., video encoder 200 or video decoder 300) may be configured to generate a reduced prediction signal by matrix vector multiplication.

Out of the reduced input vector bdry$_d$, a video coder (e.g., video encoder 200 or video decoder 300) may generate a reduced prediction signal pred$_{red}$. The latter signal is a signal on the downsampled block of width W$_{red}$ and height H$_{red}$. Here, W$_{red}$ and H$_{red}$ are defined as:

$$W_{red} = \begin{cases} 4 & \text{for } \max(W, H) \leq 8 \\ \min(W, 8) & \text{for } \max(W, H) > 8 \end{cases}$$

$$H_{red} = \begin{cases} 4 & \text{for } \max(W, H) \leq 8 \\ \min(H, 8) & \text{for } \max(W, H) > 8 \end{cases}$$

A video coder (e.g., video encoder 200 or video decoder 300) may compute the reduced prediction signal pred$_{red}$ by calculating a matrix vector product and adding an offset as follows.

pred$_{red}$=A·bdry$_{red}$+b.

Here, A is a matrix that has W$_{red}$·H$_{red}$ rows and 4 columns if W=H=4, and has 8 columns in all other cases. The vector b is a vector of size W$_{red}$·H$_{red}$.

A video coder (e.g., video encoder 200 or video decoder 300) may take the matrix A and the vector b from one of the sets S$_0$, S$_1$, S$_2$ as follows. For example, the video coder may define an index idx=idx(W,H) as follows:

$$idx(W, H) = \begin{cases} 0 & \text{for } W = H = 4 \\ 1 & \text{for } \max(W, H) = 8 \\ 2 & \text{for } \max(W, H) > 8 \end{cases}.$$

Moreover, the video coder may define m as follows:

$$m = \begin{cases} \text{mode} & \text{for } W = H = 4 \text{ and mode} < 18 \\ \text{mode} - 17 & \text{for } W = H = 4 \text{ and mode} \geq 18 \\ \text{mode} & \text{for } \max(W, H) = 8 \text{ and mode} < 10 \\ \text{mode} - 9 & \text{for } \max(W, H) = 8 \text{ and mode} \geq 10 \\ \text{mode} & \text{for } \max(W, H) > 8 \text{ and mode} < 6 \\ \text{mode} - 5 & \text{for } \max(W, H) > 8 \text{ and mode} \geq 6. \end{cases}$$

Then, if idx≤1 or idx=2 and min(W,H)>4, the video coder sets A=A$_{idx}^m$ and b=b$_{idx}^m$. In the case that idx=2 and min(W,H)=4, the video coder lets A be the matrix that arises by leaving out every row of A$_{idx}^m$ that, in the case W=4, corresponds to an odd x-coordinate in the downsampled block, or, in the case H=4, corresponds to an odd y-coordinate in the downsampled block.

Additionally, the video coder replaces the reduced prediction signal by a transpose of the reduced prediction signal in the following cases:
W=H=4 and mode ≥18
max(W,H)=8 and mode ≥10
max(W,H)>8 and mode ≥6

A video coder (e.g., video encoder 200 or video decoder 300) may use 4 as the number of multiplications for the calculation of pred$_{red}$ in the case of W=H=4 because, in this case, A has 4 columns and 16 rows. In all other cases, A has 8 columns and W$_{red}$·H$_{red}$ rows, and, in these cases, the video coder may use $8 \cdot W_{red} \cdot H_{red} \leq 4$. W·H multiplications (e.g., also in these cases, at most 4 multiplications per sample are used to compute $pred_{red}$.)

The process of averaging, matrix vector multiplication, and linear interpolation is illustrated for different block sizes and shapes in FIGS. 4-7. In some examples, the processes illustrated in FIGS. 4-7 may be applied to other shapes. For example, the process illustrated in FIG. 6 for an 8×4 block may be similarly applied to a 4×8 block.

Figure 4:
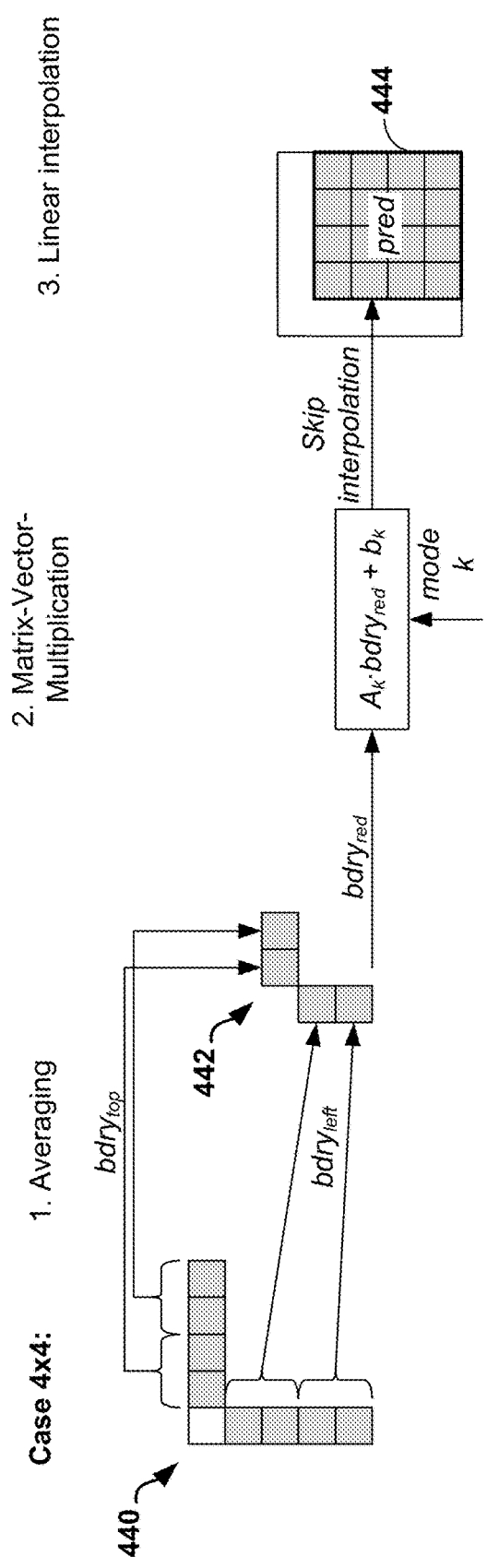
FIG. 4 is a block diagram illustrating an example of affine linear weighted intra prediction (ALWIP) for 4×4 blocks.

FIG. 4 is a block diagram illustrating an example of MIP for 4×4 blocks. In this example, samples are luma samples, however, in other examples, samples may be chroma samples. Given a 4×4 block, when performing MIP, a video coder (e.g., video encoder 200 or video decoder 300) may calculate two averages along each axis of the boundary samples that form set of luma neighboring samples 440 to generate down-sampled luma neighboring samples 442.

For example, the video coder may determine the set of luma neighboring samples based on a first line of neighboring samples left of a block (e.g., immediately adjacent to the block and left of the block). In some examples, the video coder may determine the set of luma neighboring samples based on a second line of neighboring samples above a block (e.g., immediately adjacent to the block and above the block). In the example of FIG. 4, the video coder may average a plurality of luma neighboring samples of the first line to down-sample the set of luma neighboring samples. For instance, the video coder may average each pair of luma neighboring samples of the first line to down-sample the set of luma neighboring samples. The video coder may average a plurality of luma neighboring samples of the second line to down-sample the set of luma neighboring samples. For instance, the video coder may average each pair of luma neighboring samples of the second line to down-sample the set of luma neighboring samples.

The video coder may enter the down-sampled luma neighboring samples 442 as four input samples for the matrix vector multiplication. The video coder may take the matrices from the set $S_0$. After adding an offset, the video coder may determine 16 final prediction samples as predicted luma samples 444 (also referred to herein as simply "luma samples 444"). In this example, the video coder may omit linear interpolation for generating the prediction signal (e.g., luma samples 444). Thus, the video coder may perform a total of (4·16)/(4·4)=4 multiplications per sample.

Figure 5:
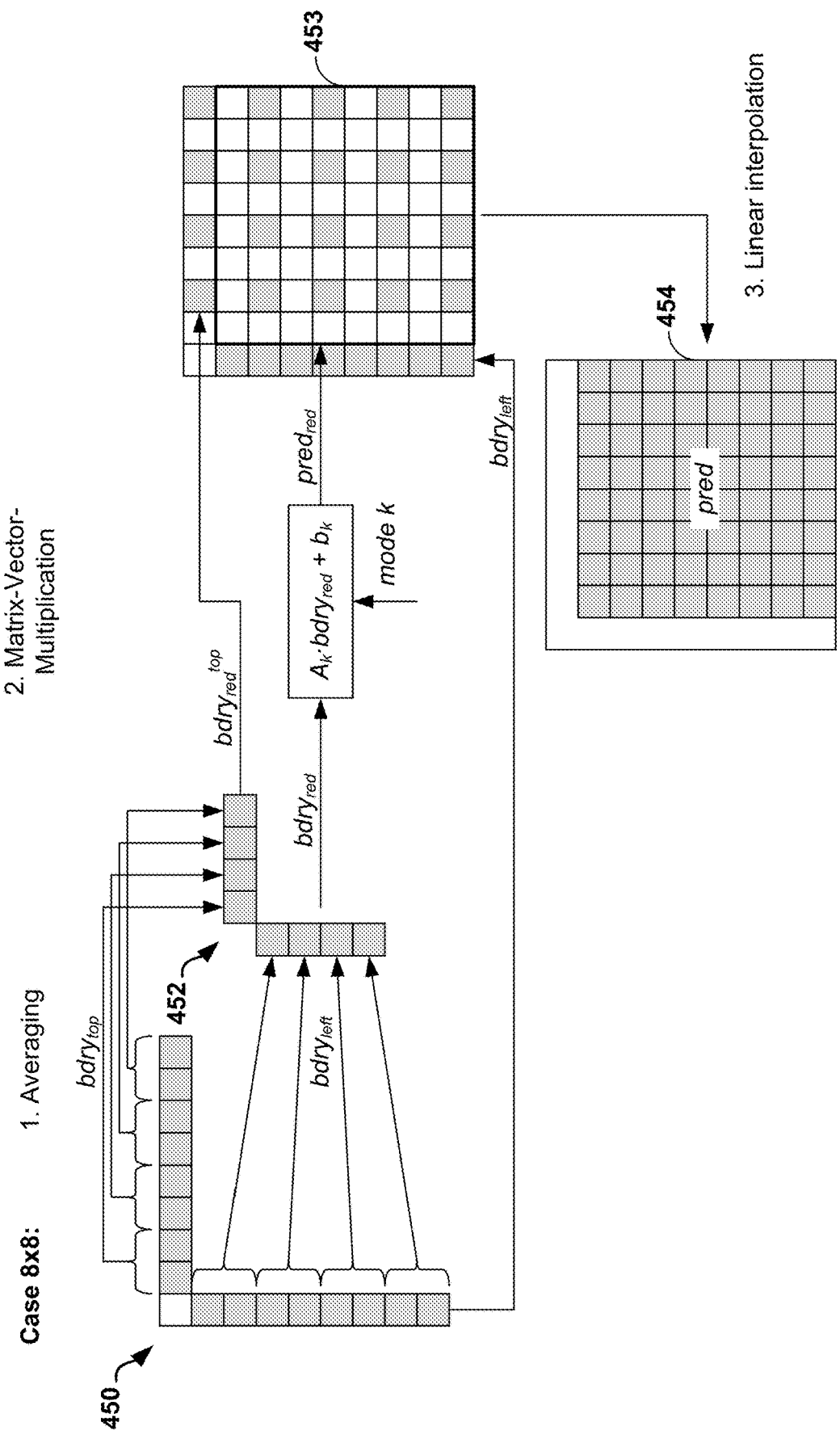
FIG. 5 is a block diagram illustrating an example of ALWIP for 8×8 blocks.

FIG. 5 is a block diagram illustrating an example of MIP for 8×8 blocks. In this example, samples are luma samples, however, in other examples, samples may be chroma samples. Given an 8×8 block, when performing MIP, a video coder (e.g. video encoder 200 or video decoder 300) may calculate four averages along each axis of the boundary samples that form set of luma neighboring samples 450 to generate down-sampled luma neighboring samples 452.

For example, the video coder may determine the set of luma neighboring samples based on a first line of neighboring samples left of a block (e.g., immediately adjacent to the block and left of the block). In some examples, the video coder may determine the set of luma neighboring samples based on a second line of neighboring samples above a block (e.g., immediately adjacent to the block and above the block). In the example of FIG. 5, the video coder may average a plurality of luma neighboring samples of the first line to down-sample the set of luma neighboring samples. For instance, the video coder may average each pair of luma neighboring samples of the first line to down-sample the set of luma neighboring samples. The video coder may average a plurality of luma neighboring samples of the second line to down-sample the set of luma neighboring samples. For instance, the video coder may average each pair of luma neighboring samples of the second line to down-sample the set of luma neighboring samples.

The video coder may enter the down-sampled luma neighboring samples 452 as eight input samples for the matrix vector multiplication. The matrices are taken from the set $S_1$. This yields 16 samples on the odd positions of a reduced prediction block 453. Thus, the video coder may perform a total of (8·16)/(8·8)=2 multiplications per sample. After adding an offset, the video coder vertically interpolates the samples of reduced prediction block 453 using the reduced top boundary and horizontally interpolates the samples of reduced prediction block 453 using the original left boundary to generate predicted luma samples 454 (also referred to herein as simply "luma samples 454"). The interpolation process performed by the video coder may not use any multiplications in this case. Thus, the video coder may use a total of two multiplications per sample to perform MIP.

Figure 6:
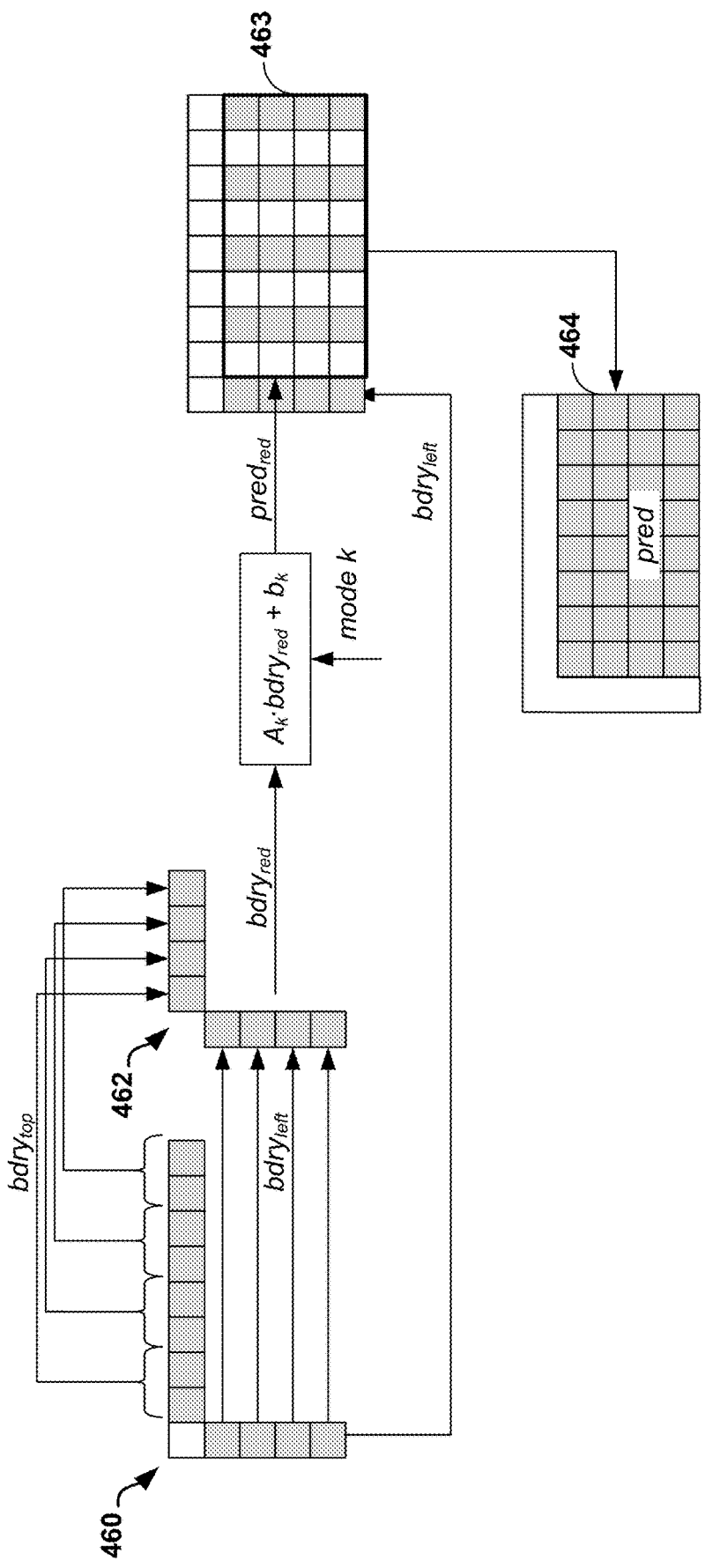
FIG. 6 is a block diagram illustrating an example of ALWIP for 8×4 blocks.

FIG. 6 is a block diagram illustrating an example of MIP for 8×4 blocks. In this example, samples are luma samples, however, in other examples, samples may be chroma samples. Given an 8×4 block, when performing MIP, a video coder calculates four averages along the horizontal axis of the boundary and the four original boundary values on the left boundary that form set of luma neighboring samples 460 to generate down-sampled luma neighboring samples 462.

For example, the video coder may determine the set of luma neighboring samples based on a first line of neighboring samples left of a block (e.g., immediately adjacent to the block and left of the block). In some examples, the video coder may determine the set of luma neighboring samples based on a second line of neighboring samples above a block (e.g., immediately adjacent to the block and above the block). In the example of FIG. 6, the video coder may refrain from averaging luma neighboring samples of the first line. The video coder may average a plurality of luma neighboring samples of the second line to down-sample the set of luma neighboring samples. For instance, the video coder may average each pair of luma neighboring samples of the second line to down-sample the set of luma neighboring samples.

The video coder may enter the down-sampled luma neighboring samples 452 as eight input samples for the matrix vector multiplication. The matrices are taken from the set $S_1$. This yields 16 samples on the odd horizontal and each vertical positions of a reduced prediction block 463. Thus, the video coder may perform a total of (8·16)/(8·4)=4 multiplications per sample. After adding an offset, the video coder horizontally interpolates the samples of reduced prediction block 463 using the original left boundary to generate predicted luma samples 464 (also referred to herein as simply "luma samples 464"). The interpolation process performed by the video coder may not use any multiplications in this case. Thus, the video coder may use a total of 4 multiplications per sample to perform MIP. The transposed case (e.g., a 4×8 block) is treated accordingly.

Figure 7:
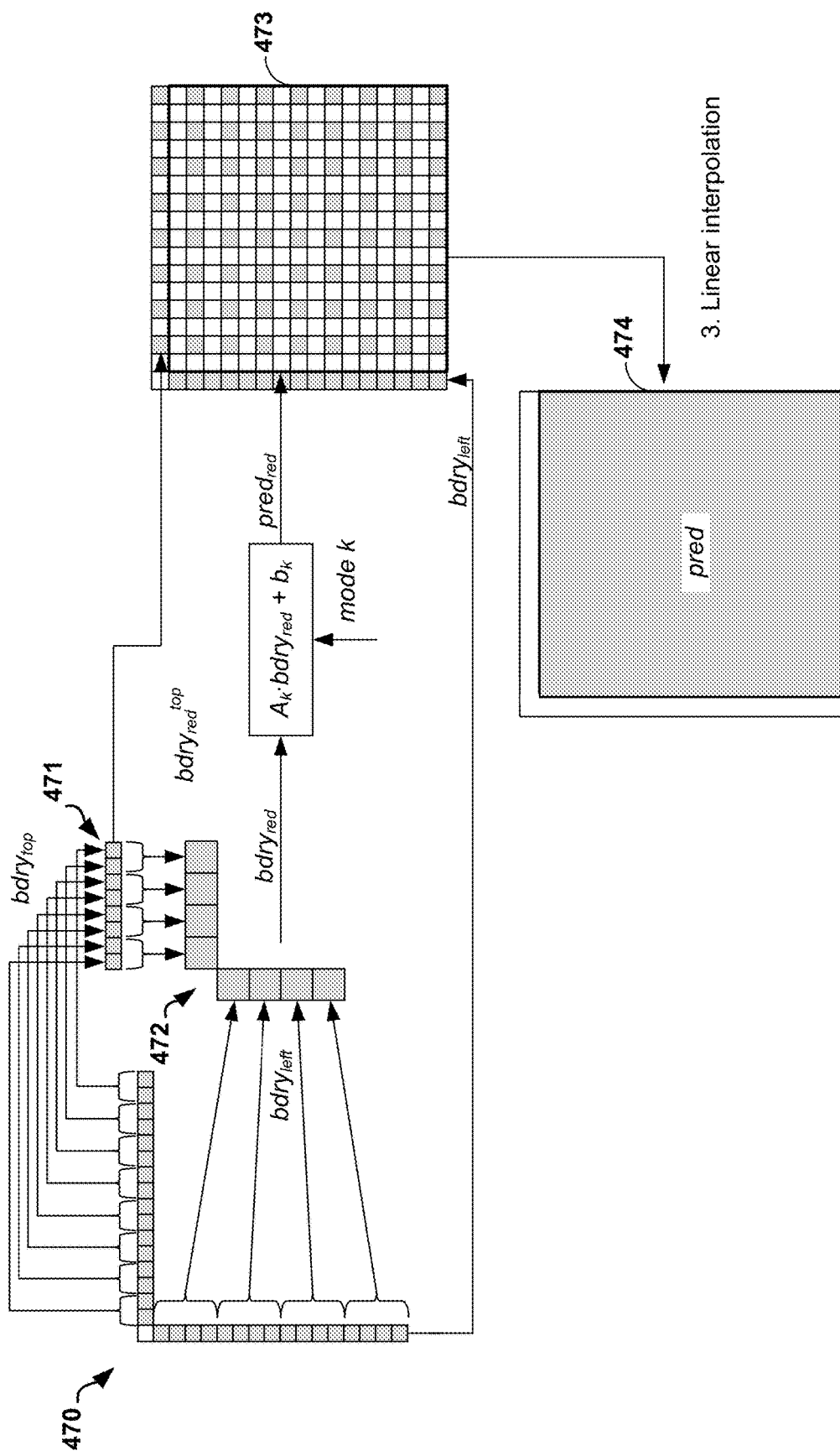
FIG. 7 is a block diagram illustrating an example of ALWIP for 16×16 blocks.

FIG. 7 is a block diagram illustrating an example of MIP for 16×16 blocks. In this example, samples are luma samples, however, in other examples, samples may be chroma samples. Given a 16×16 block, when performing MIP, a video coder may calculate four averages along each axis of the boundary that form set of luma neighboring samples 470 to generate down-sampled luma neighboring samples 472.

For example, the video coder may determine the set of luma neighboring samples based on a first line of neighboring samples left of a block (e.g., immediately adjacent to the block and left of the block). In some examples, the video coder may determine the set of luma neighboring samples based on a second line of neighboring samples above a block (e.g., immediately adjacent to the block and above the block). In the example of FIG. 7, the video coder may average a plurality of luma neighboring samples of the first line to down-sample the set of luma neighboring samples. For instance, the video coder may average each set of four adjacent luma neighboring samples of the first line to down-sample the set of luma neighboring samples. The video coder may average a plurality of luma neighboring samples of the second line to down-sample the set of luma neighboring samples. For instance, the video coder may average each adjacent set of four adjacent luma neighboring samples of the second line to down-sample the set of luma neighboring samples.

The video coder may enter the down-sampled luma neighboring samples 472 as eight input samples for the matrix vector multiplication. The matrices are taken from the set $S_2$. This yields 64 samples on the odd positions of the prediction block. Thus, the video coder may perform a total of (8·64)/(16·16)=2 multiplications per sample. After adding an offset, the video coder vertically interpolates the samples of reduced prediction block 473 using eight averages of the top boundary and horizontally interpolates the samples of reduced prediction block 473 using the original left boundary to generate predicted luma samples 474 (also referred to herein as simply "luma samples 474"). The interpolation process, in this case, does not add any multiplications. Therefore, the video coder may use two multiplications per sample to perform MIP. For larger shapes, the procedure is substantially similar and may result in a number of multiplications per sample that is less than four.

For W×8 blocks with W>8, a video coder (e.g., video encoder 200 or video decoder 300) may only use horizontal interpolation, as the samples are given at the odd horizontal and each vertical positions. In this case, the video coder may perform (8·64)/(W·8)=64/W multiplications per sample to calculate a reduced prediction block. For W=16, in this case, the video coder may use no additional multiplications for linear interpolation. For W>16, the video coder may use a number of additional multiplications per sample for linear interpolation that is less than two. Thus, the video coder may use a total number of multiplications per sample that is less than or equal to four.

Additionally, for W×4 blocks with W>8, let $A_k$ be the matrix that arises by leaving out every row that corresponds to an odd entry along the horizontal axis of the downsampled block. Thus, the output size is 32, and again, a video coder (e.g., video encoder 200 or video decoder 300) may perform only horizontal interpolation and omit vertical interpolation. For calculation of the reduced prediction, the video coder may perform (8·32)/(W·4)=64/W multiplications per sample. For W=16, the video coder may use no additional multiplications, while, for W>16, the video coder may use less than 2 multiplication per sample for linear interpolation. Thus, the video coder may use a total number of multiplications that is less than or equal to four. The transposed cases (e.g., 8 W blocks with W>8) are treated accordingly.

A video coder (e.g., video encoder 200 or video decoder 300) may apply single step linear interpolation for MIP. For a W×H block with max(W,H)≥8, the prediction signal (e.g., luma samples for a block, chroma samples for a block, etc.) arises from the reduced prediction signal (e.g., a reduced prediction block) $pred_{red}$ on $W_{red}×H_{red}$ by linear interpolation. Depending on the block shape of a block of video data, the video coder may perform linear interpolation in vertical, horizontal, or both vertical and horizontal directions. If linear interpolation is to be applied in both directions and if the block of data has a block shape of W<H, the video coder may apply linear interpolation in the horizontal direction before applying linear interpolation in the vertical direction. If the block of data has a block shape that is not W<H, the video coder may apply linear interpolation in the vertical direction before applying linear interpolation in the horizontal direction.

Consider, without loss of generality, a W×H block with max(W,H)≥8 and W≥H. In this example, a video coder (e.g., video encoder 200 or video decoder 300) may perform one-dimensional linear interpolation as follows. The following examples describes linear interpolation in the vertical direction. The video coder may extend the reduced prediction signal to the top by the boundary signal. In this example, the vertical up-sampling factor is defined as $U_{ver}=H/H_{red}$ and $U_{ver}=2^{u_{ver}}>1$. The video decoder may calculate the extended reduced prediction signal using the following.

$$pred_{red}[x][-1] = \begin{cases} bdry_{red}^{top}[x] & \text{for } W = 8 \\ bdry_{red}^{top}[x] & \text{for } W > 8. \end{cases}$$

Then, from this extended reduced prediction signal, the video coder may generate the vertically linear interpolated prediction signal by calculating the following:

$$pred_{red}^{ups,ver}[x][U_{ver} \cdot y + k] = \left((U_{ver} - k - 1) \cdot pred_{red}[x][y-1] + (k+1) \cdot pred_{red}[x][y] + \frac{U_{ver}}{2}\right) \gg u_{ver}$$

for $0 \leq x < W_{red}$, $0 \leq y < H_{red}$ and $0 \leq k < U_{ver}$.

As matrix vector multiplication may lead to out-of-range values, a video coder (e.g., video encoder 200 or video decoder 300) may add an additional clipping stage on $pred_{red}^{ups,ver}$ output prediction to help to guarantee samples in the range of $[0, 2^{bitdepth}-1]$.

To reduce the cross-component redundancy, a video coder (e.g., video encoder 200 or video decoder 300) may use CCLM prediction mode in the VVC Draft 5, for which the chroma samples are predicted based on the reconstructed luma samples of the same CU by using a linear model as follows:

$$pred_c(i,j) = \alpha \cdot rec_L'(i,j) + \beta \tag{3-1}$$

where $pred_C(i,j)$ represents the predicted chroma samples in a CU and $rec_L(i,j)$ represents the downsampled reconstructed luma samples of the same CU.

A video coder (e.g., video encoder 200 or video decoder 300) may calculate the CCLM parameters (e.g., α and β) with, for example, at most four neighbouring chroma samples and their corresponding down-sampled luma samples. That is, to predict chroma samples using CCLM prediction, the video coder may be configured to calculate CCLM parameters (e.g., α and β) based on down-sampled luma neighboring samples. As described further herein, the down-sampled luma neighboring samples used for CCLM may be generated using down-sampling techniques for MIP. In this example, the video coder may predict the chroma samples based on the CCLM parameters and down-sampled reconstructed luma samples for the block. For instance, the video coder may apply the linear model of equation (3-1).

Suppose the current chroma block dimensions are W×H, then the video coder may set W' and H' as follows.

W'=W, H'=H when LM mode is applied;
W'=W+H when LM-A mode is applied;
H'=H+W when LM-L mode is applied.

The above neighbouring positions are denoted as S[0, −1] . . . S[W'−1, −1] and the left neighbouring positions are denoted as S[−1, 0] . . . S[−1, H'−1]. In this example, a video coder (e.g., video encoder 200 or video decoder 300) may select the four samples as follows.

- S[W'/4, −1], S[3 W'/4, −1], S[−1, H'/4], S[−1, 3H'/4] when LM mode is applied and both above and left neighbouring samples are available;
- S[W'/8, −1], S[3 W'/8, −1], S[5 W'/8, −1], S[7 W'/8, −1] when LM-A mode is applied or only the above neighbouring samples are available;
- S[−1, H'/8], S[−1, 3H'/8], S[−1, 5H'/8], S[−1, 7H'/8] when LM-L mode is applied or only the left neighbouring samples are available.

A video coder (e.g., video encoder 200 or video decoder 300) may down-sample four neighbouring luma samples at the selected positions and the video coder may compare the down-sampled four neighbouring luma samples four times to find two smaller values: $x^0_A$ and $x^1_A$, and two larger values: $x^0_B$ and $x^1_B$. Their corresponding chroma sample values are denoted as $y^0_A$, $y^1_A$, $y^0_B$ and $y^1$B. Then, the video coder may derive $x_A$, $x_B$, $y_A$ and $y_B$ as follows.

$$X_a = (x^0_A + x^1_A + 1) \gg 1; X_b = (x^0_B + x^1_B + 1) \gg 1; Y_a = (y^0_A + y^1_A + 1) \gg 1; Y_b = (y^0_B + y^1_B + 1) \gg 1 \quad (3\text{-}2)$$

A video coder (e.g., video encoder 200 or video decoder 300) may obtain the linear model parameters α and β according to the following equations:

$$\alpha = \frac{Y_a - Y_b}{X_a - X_b} \quad (3\text{-}3)$$

$$\beta = Y_b - \alpha \cdot X_b \quad (3\text{-}4)$$

Figure 8:
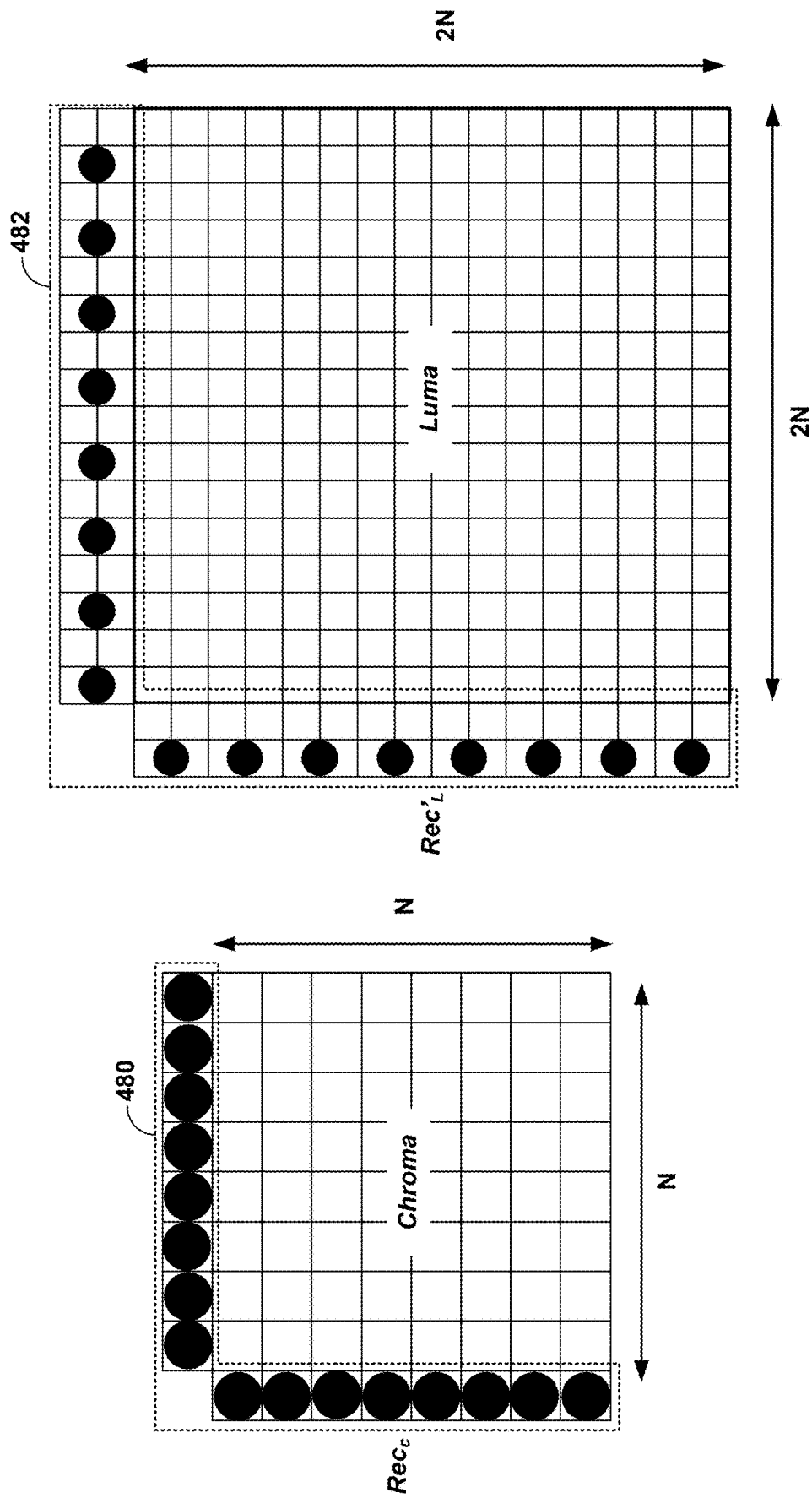
FIG. 8 is a conceptual diagram illustrating sample locations for deriving parameters for cross-component linear model prediction mode.

FIG. 8 shows an example of the location of the left and above neighboring samples and the sample of the current block used for derivation of CCLM parameters (e.g., α and β parameters) involved in the CCLM prediction. As shown, chroma neighboring samples 480 correspond to reconstructed chroma samples from a neighboring left block and from a neighboring above block. However, down-sampled luma neighboring samples 482 correspond to reconstructed luma samples that are down-sampled from reconstructed samples of a neighboring left block and from a neighboring above block.

Rather than down-sampling luma neighboring samples for MIP and again down-sampling the same luma neighboring samples using a different down-sampling technique to generate down-sampled luma neighboring samples 482 for CCLM prediction, a video coder (e.g., video encoder 200 or video decoder 300) may apply CCLM prediction to predict chroma samples for the same block using the down-sampled luma neighboring samples used for MIP. In this way, the video coder may use down-sampled luma neighboring samples 482 for both MIP and CCLM prediction. Configuring the video coder to use down-sampled luma neighboring samples 482 for both MIP and CCLM prediction may help to reduce a complexity of the video coder compared to video coders that do not use down-sampled luma neighboring samples for both MIP and CCLM prediction.

A video coder (e.g., video encoder 200 or video decoder 300) may be configured to implement the division operation to calculate parameter a with a look-up table. To reduce the memory required for storing the table, the video coder may express (e.g., store) the diff value (e.g., a difference between maximum and minimum values) and the parameter a by an exponential notation. For example, the video coder may approximate diff with a 4-bit significant part and an exponent. Consequently, the video coder may reduce the table for 1/diff into 16 elements for 16 values of the significand as follows.

$$\text{DivTable}[\ ] = \{0,7,6,5,5,4,4,3,3,2,2,1,1,1,1,0\} \quad (3\text{-}5)$$

This would have a benefit of both reducing the complexity of the calculation as well as the memory size required for storing the needed tables.

A video coder (e.g., video encoder 200 or video decoder 300) may use the above template (e.g., samples of a line of reconstructed neighboring boundary samples above the block) and left template (e.g., samples of a line of reconstructed neighboring boundary samples left the block) to calculate the linear model coefficients together. The video coder may use the above template and left template in the other 2 LM modes, called LM_A mode, for the above template, and LM_L mode, for the left template.

In LM_A mode, a video coder (e.g., video encoder 200 or video decoder 300) may use only the above template to calculate the linear model coefficients. To get more samples, the video coder may extent the above template to (W+H). In LM_L mode, the video coder may use only the left template to calculate the linear model coefficients. To get more samples, the video code may extent the left template to (H+W). For a non-square block, the video coder may extent the above template to W+W and the video coder may extend the left template to H+H.

To match the chroma sample locations for 4:2:0 video sequences, a video coder (e.g., video encoder 200 or video decoder 300) may apply two types of downsampling filters to luma samples to achieve a 2 to 1 downsampling ratio in both horizontal and vertical directions. A video encoder (e.g., video encoder 200) may signal a selection of a down-sampling filter by a sequence parameter set (SPS) level flag. Two example down-sampling filters are as follows, which are corresponding to "type-0" and "type-2" content, respectively.

$$rec'_L(i, j) = \left[ \begin{array}{l} rec_L(2i-1, 2j-1) + 2 \cdot rec_L(2i-1, 2j-1) + rec_L(2i+1, 2j-1) + \\ rec_L(2i-1, 2j) + 2 \cdot rec_L(2i, 2j) + rec_L(2i+1, 2j) + 4 \end{array} \right] \gg 3 \quad (3\text{-}6)$$

$$rec'_L(i, j) = \left[ \begin{array}{l} rec_L(2i, 2j-1) + rec_L(2i-1, 2j) + 4 \cdot rec_L(2i, 2j) + \\ rec_L(2i+1, 2j) + rec_L(2i, 2j+1) + 4 \end{array} \right] \gg 3 \quad (3\text{-}7)$$

In some examples, a video coder (e.g., video encoder 200 or video decoder 300) may use only one luma line (e.g., general line buffer in intra prediction) to make the downsampled luma samples when the upper reference line is at the CTU boundary.

A video coder (e.g., video encoder 200 or video decoder 300) may perform the parameter computation described above as part of the decoding process and is not just as an encoder search operation. As a result, a video encoder (e.g., video encoder 200) may use no syntax to convey the α and β values to a video decoder (e.g., video decoder 300).

For chroma intra mode coding, a video coder (e.g., video encoder 200 or video decoder 300) may be configured to use a total of 8 intra modes for chroma intra mode coding. The 8 intra modes for chroma intra mode coding may include five traditional intra modes and three cross-component linear model modes (CCLM, LM_A, and LM_L). Example Chroma mode signaling and derivation process are shown in Table 3-3. Chroma mode coding may directly depend on the intra prediction mode of the corresponding luma block. Because separate block partitioning structure for luma components and chroma components is enabled in I slices, one chroma block may correspond to multiple luma blocks. Therefore, for Chroma Direct Mode (DM), the video coder may directly inherit the intra prediction mode of the corresponding luma block covering the center position of the current chroma block.

TABLE 3-3

Derivation of chroma prediction mode from luma mode when cclm_is enabled.

| Chroma prediction mode | Corresponding luma intra prediction mode | | | | |
|---|---|---|---|---|---|
| | 0 | 50 | 18 | 1 | X (0 <= X <= 66) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 81 | 81 | 81 | 81 | 81 |
| 5 | 82 | 82 | 82 | 82 | 82 |
| 6 | 83 | 83 | 83 | 83 | 83 |
| 7 | 0 | 50 | 18 | 1 | X |

One example specification for linear model estimation in VVC Draft 5 is the following:

Specification of INTRA_LT_CCLM, INTRA_L_CCLM and INTRA_T_CCLM Intra Prediction Mode Inputs to this process are:
the intra prediction mode predModeIntra,
a sample location (xTbC, yTbC) of the top-left sample of the current transform block relative to the top-left sample of the current picture,
a variable nTbW specifying the transform block width,
a variable nTbH specifying the transform block height,
chroma neighbouring samples p[x][y], with x=-1, y=0 . . . 2*nTbH-1 and x=0 . . . 2*nTbW-1, y=-1.

Output of this process are predicted samples predSamples [x][y], with x=0 . . . nTbW-1, y=0 . . . nTbH-1.

The current luma location (xTbY, yTbY) is derived as follows:

$$(xTbY, yTbY) = (xTbC << (SubWidthC-1), yTbC << (SubHeightC-1)) \quad (8-145)$$

The variables availL, availT and availTL are derived as follows:
The availability of left neighbouring samples derivation process for a block as specified in clause 6.4.X [Ed. (BB): Neighbouring blocks availability checking process tbd] is invoked with the current chroma location (xCurr, yCurr) set equal to (xTbC, yTbC) and the neighbouring chroma location (xTbC-1, yTbC) as inputs, and the output is assigned to availL.
The availability of top neighbouring samples derivation process for a block as specified in clause 6.4.X [Ed. (BB): Neighbouring blocks availability checking process tbd] is invoked with the current chroma location (xCurr, yCurr) set equal to (xTbC, yTbC) and the neighbouring chroma location (xTbC, yTbC-1) as inputs, and the output is assigned to availT.
The variable availTL is derived as follows:

$$availTL = availL \text{ \&\& } availT \quad (8-146)$$

The number of available top-right neighbouring chroma samples numTopRight is derived as follows:
The variable numTopRight is set equal to 0 and availTR is set equal to TRUE.
When predModeIntra is equal to INTRA_T_CCLM, the following applies for x=nTbW . . . 2*nTbW-1 until availTR is equal to FALSE or x is equal to 2*nTbW-1:
The availability derivation process for a block as specified in clause 6.4.X [Ed. (BB): Neighbouring blocks availability checking process tbd] is invoked with the current chroma location (xCurr, yCurr) set equal to (xTbC, yTbC) and the neighbouring chroma location (xTbC+x, yTbC-1) as inputs, and the output is assigned to availableTR
When availableTR is equal to TRUE, numTopRight is incremented by one.

The number of available left-below neighbouring chroma samples numLeftBelow is derived as follows:
The variable numLeftBelow is set equal to 0 and availLB is set equal to TRUE.
When predModeIntra is equal to INTRA_L_CCLM, the following applies for y=nTbH . . . 2*nTbH-1 until availLB is equal to FALSE or y is equal to 2*nTbH-1:
The availability derivation process for a block as specified in clause 6.4.X [Ed. (BB): Neighbouring blocks availability checking process tbd] is invoked with the current chroma location (xCurr, yCurr) set equal to (xTbC, yTbC) and the neighbouring chroma location (xTbC-1, yTbC+y) as inputs, and the output is assigned to availableLB
When availableLB is equal to TRUE, numLeftBelow is incremented by one.

The number of available neighbouring chroma samples on the top and top-right numSampT and the number of available neighbouring chroma samples on the left and left-below numSampL are derived as follows:
If predModeIntra is equal to INTRA_LT_CCLM, the following applies:

$$numSampT = availT ? nTbW : 0 \quad (8-147)$$

$$numSampL = availL ? nTbH : 0 \quad (8-148)$$

Otherwise, the following applies:

$$numSampT = (availT \text{ \&\& } predModeIntra == INTRA\_T\_CCLM) ? (nTbW + Min(numTopRight, nTbH)) : 0 \quad (8-149)$$

$$numSampL = (availL \text{ \&\& } predModeIntra == INTRA\_L\_CCLM) ? (nTbH + Min(numLeftBelow, nTbW)) : 0 \quad (8-150)$$

The variable bCTUboundary is derived as follows:

$$bCTUboundary=(yTbC\ \&(1<<(Ctb\ \text{Log 2Size}Y-1)-1)==0)?\text{TRUE}:\text{FALSE}. \quad (8\text{-}151)$$

The variable cntN and array pickPosN with N being replaced by L and T, are derived as follows:
The variable numIs4N is derived as follows:

$$numIs4N=((availT\ \&\&\ availL\ \&\&\ predModeIntra==INTRA\_LT\_CCLM)?0:1) \quad (8\text{-}152)$$

The variable startPosN is set equal to numSampN>>(2+numIs4N).
The variable pickStepN is set equal to Max(1, numSampN>>(1+numIs4N)).
If availN is equal to TRUE and predModeIntra is equal to INTRA_LT_CCLM or INTRA_N_CCLM, the following assignments are made:
  cntN is set equal to Min(numSampN, (1+numIs4N)<<1).
  pickPosN[pos] is set equal to (startPosN+pos*pickStepN), with pos=0 ... cntN-1.
Otherwise, cntN is set equal to 0.
The prediction samples predSamples[x][y] with x=0 ... nTbW-1, y=0 ... nTbH-1 are derived as follows:
If both numSampL and numSampT are equal to 0, the following applies:

$$predSamples[x][y]=1<<(BitDepth_c-1) \quad (8\text{-}153)$$

Otherwise, the following ordered steps apply:
1. The collocated luma samples pY[x][y] with x=0 ... nTbW*SubWidthC-1, y=0 ... nTbH*SubHeightC-1 are set equal to the reconstructed luma samples prior to the deblocking filter process at the locations (xTbY+x, yTbY+y).
2. The neighbouring luma samples pY[x][y] are derived as follows:
   When numSampL is greater than 0, the neighbouring left luma samples pY[x][y] with x=-1 ... -3, y=0 ... SubHeightC*numSampL-1, are set equal to the reconstructed luma samples prior to the deblocking filter process at the locations (xTbY+x, yTbY+y).
   When numSampT is greater than 0, the neighbouring top luma samples pY[x][y] with x=0 ... SubWidthC*numSampT-1, y=-1, -2, are set equal to the reconstructed luma samples prior to the deblocking filter process at the locations (xTbY+x, yTbY+y).
   When availTL is equal to TRUE, the neighbouring top-left luma samples pY[x][y] with x=-1, y=-1, -2, are set equal to the reconstructed luma samples prior to the deblocking filter process at the locations (xTbY+x, yTbY+y).
3. The down-sampled collocated luma samples pDsY[x][y] with x=0 ... nTbW-1, y=0 ... nTbH-1 are derived as follows:
   If both SubWidthC and SubHeightC are equal to 1, the following applies:
   pDsY[x][y] with x=1 ... nTbW-1, y=1 ... nTbH-1 is derived as follows:

$$pDstY[x][y]=pY[x][y] \quad (8\text{-}154)$$

Otherwise, the following applies:
The one-dimensional filter coefficients array F1 and F2, and the 2-dimensional filter coefficients arrays F3 and F4 are specified as follows.

$$F1[i]\ \text{with}\ i=0\ldots 2 \quad (8\text{-}155)$$

$$F2[0]=1, F2[1]=2, F2[2]=1 \quad (8\text{-}156)$$

$$F3[1][j]=F4[1][j]=0,\ \text{with}\ i=0\ldots 2, j=0\ldots 2 \quad (8\text{-}157)$$

If both SubWidthC and SubHeightC are equal to 2, the following applies:

$$F1[0]=1, F1[1]=1 \quad (8\text{-}158)$$

$$F3[0][1]=1, F3[1][1]=4, F2[2][1]=1, F3[1][0]=1, F3[1][2]=1 \quad (8\text{-}159)$$

$$F4[0][1]=1, F4[1][1]=2, F4[2][1]=1 \quad (8\text{-}160)$$

$$F4[0][2]=1, F4[1][2]=2, F4[2][2]=1 \quad (8\text{-}161)$$

Otherwise, the following applies:

$$F1[0]=2, F1[1]=0 \quad (8\text{-}162)$$

$$F3[1][1]=8 \quad (8\text{-}163)$$

$$F4[0][1]=2, F4[1][1]=4, F4[2][1]=2, \quad (8\text{-}164)$$

If sps_cclm_colocated_chroma_flag is equal to 1, the following applies:
pDsY[x][y] with x=1 ... nTbW-1, y=1 ... nTbH-1 is derived as follows:

$$\begin{aligned}pDsY[x][y]=&(F3[1][0]*pY[SubWidthC*x]\\&[SubHeightC*y-1]+F3[0][1]*pY[SubWidthC*x-\\&1][SubHeightC*y]+F3[1][1]*pY[SubWidthC*x]\\&[SubHeightC*y]+F3[2][1]*pY[SubWidthC*x+1]\\&[SubHeightC*y]+F3[1][2]*pY[SubWidthC*x]\\&[SubHeightC*y+1]+4)>>3\end{aligned} \quad (8\text{-}165)$$

If availL is equal to TRUE, pDsY[0][y] with y=1 ... nTbH-1 is derived as follows:

$$\begin{aligned}pDsY[0][y]=&(F3[1][0]*pY[0][SubHeightC*y-1]+F3\\&[0][1]*pY[-1][SubHeightC*y]+F3[1][1]*pY[0]\\&[SubHeightC*y]+F3[2][1]*pY[1]\\&[SubHeightC*y]+F3[1][2]*pY[0]\\&[SubHeightC*y+1]+4)>>3\end{aligned} \quad (8\text{-}166)$$

Otherwise (availL is equal to FALSE), pDsY[0][y] with y=1 ... nTbH-1 is derived as follows:

$$\begin{aligned}pDsY[0][y]=&(F2[0]*pY[0][SubHeightC*y-1]+\\&F2[1]*pY[0][SubHeightC*y]+F2[2]*pY[0]\\&[SubHeightC*y+1]+2)>>2\end{aligned} \quad (8\text{-}167)$$

If availT is equal to TRUE, pDsY[x][0] with x=1 ... nTbW-1 is derived as follows:

$$\begin{aligned}pDsY[x][0]=&(F3[1][0]*pY[SubWidthC*x][1]+\\&F3[0][1]*pY[SubWidthC*x-1][0]+F3[1][1]*pY\\&[SubWidthC*x][0]+F3[2][1]*pY[SubWidthC*x+\\&1][0]+F3[1][2]*pY[SubWidthC*x][1]+4)>>3\end{aligned} \quad (8\text{-}168)$$

Otherwise (availT is equal to FALSE), pDsY[x][0] with x=1 ... nTbW-1 is derived:

$$\begin{aligned}pDsY[x][0]=&(F2[0]*pY[SubWidthC*x-1][0]+\\&F2[1]*pY[SubWidthC*x][0]+F2[2]*pY\\&[SubWidthC*x+1][0]+2)>>2\end{aligned} \quad (8\text{-}169)$$

If availL is equal to TRUE and availT is equal to TRUE, pDsY[0][0] is derived as follows:

$$\begin{aligned}pDsY[0][0]=&(F3[1][0]*pY[0][-1]+F3[0][1]*pY[-1]\\&[0]+F3[1][1]*pY[0][0]+F3[2][1]*pY[1][0]+F3[1]\\&[2]*pY[0][1]+4)>>3\end{aligned} \quad (8\text{-}170)$$

Otherwise if availL is equal to TRUE and availT is equal to FALSE, pDsY[0][0] is derived as follows:

$$\begin{aligned}pDsY[0][0]=&(F2[0]*pY[-1][0]+F2[1]*pY[0][0]+\\&F2[2]*pY[1][0]+2)>>2\end{aligned} \quad (8\text{-}171)$$

Otherwise if availL is equal to FALSE and availT is equal to TRUE, pDsY[0][0] is derived as follows:

$$pDsY[0][0]=(F2[0]*pY[0][-1]+F2[1]*pY[0][0]+F2[2]*pY[0][1]+2)>>2 \quad (8\text{-}172)$$

Otherwise (availL is equal to FALSE and availT is equal to FALSE), pDsY[0][0] is derived as follows:

$$pDsY[0][0]=pY[0][0] \quad (8\text{-}173)$$

Otherwise (sps_cclm_colocated_chroma_flag is equal to 0), the following applies:
pDsY[x][y] with x=1 . . . nTbW−1, y=0 . . . nTbH−1 is derived as follows:

$$pDsY[x][y]=(F4[0][1]*pY[SubWidthC*x-1][SubHeightC*y]+F4[0][2]*pY[SubWidthC*x-1][SubHeightC*y+1]+F4[1][1]*pY[SubWidthC*x][SubHeightC*y]+F4[1][2]*pY[SubWidthC*x][SubHeightC*y+1]+F4[2][1]*pY[SubWidthC*x+1][SubHeightC*y]+F4[2][2]*pY[SubWidthC*x+1][SubHeightC*y+1]+4)>>3 \quad (8\text{-}174)$$

If availL is equal to TRUE, pDsY[0][y] with y=0 . . . nTbH−1 is derived as follows:

$$pDsY[0][y]=(F4[0][1]*pY[1][SubHeightC*y]+F4[0][2]*pY[1][SubHeightC*y+1]+F4[1][1]*pY[0][SubHeightC*y]+F4[1][2]*pY[0][SubHeightC*y+1]+F4[2][1]*pY[1][SubHeightC*y]+F4[2][2]*pY[1][SubHeightC*y+1]+4)>>3 \quad (8\text{-}175)$$

Otherwise (availL is equal to FALSE), pDsY[0][y] with y=0 . . . nTbH−1 is derived as follows:

$$pDsY[0][y]=(F1[0]*pY[0][SubHeightC*y]+F1[1]*pY[0][SubHeightC*y+1]+1)>>1 \quad (8\text{-}176)$$

4. When numSampL is greater than 0, the selected neighbouring left chroma samples pSelC[idx] are set equal to p[1][pickPosL[idx]] with idx=0 . . . cntL−1, and the selected down-sampled neighbouring left luma samples pSelDsY[idx] with idx=0 . . . cntL−1 are derived as follows:
The variable y is set equal to pickPosL[idx].
If both SubWidthC and SubHeightC are equal to 1, the following applies:

$$pSelDsY[idx]=pY[1][y] \quad (8\text{-}177)$$

Otherwise the following applies:
If sps_cclm_colocated_chroma_flag is equal to 1, the following applies:
If y is greater than 0 or availTL is equal to TRUE, pSelDsY[idx] is derived as follows:

$$pSelDsY[idx]=(F3[1][0]*pY[-SubWidthC][SubHeightC*y-1]+F3[0][1]*pY[-1-SubWidthC][SubHeightC*y]+F3[1][1]*pY[-SubWidthC][SubHeightC*y]+F3[2][1]*pY[1-SubWidthC][SubHeightC*y]+F3[1][2]*pY[-SubWidthC][SubHeightC*y+1]+4)>>3 \quad (8\text{-}178)$$

Otherwise (y is equal to 0), pSelDsY[idx] is derived as follows:

$$pSelDsY[idx]=(F2[0]*pY[-1-SubWidthC][0]+F2[1]*pY[-SubWidthC][0]+F2[2]*pY[1-SubWidthC][0]+2)>>2 \quad (8\text{-}179)$$

Otherwise (sps_cclm_colocated_chroma_flag is equal to 0), the following applies:

$$pSelDsY[idx]=(F4[0][1]*pY[-1-SubWidthC][SubHeightC*y]+F4[0][2]*pY[-1-SubWidthC][SubHeightC*y+1]+F4[1][1]*pY[-SubWidthC][SubHeightC*y]+F4[1][2]*pY[-SubWidthC][SubHeightC*y+1]+F4[2][1]*pY[1-SubWidthC][SubHeightC*y]+F4[2][2]*pY[1-SubWidthC][SubHeightC*y+1]+4)>>3 \quad (8\text{-}180)$$

5. When numSampT is greater than 0, the selected neighbouring top chroma samples pSelC[idx] are set equal to p[pickPosT[idx−cntL]][−1] with idx=cntL . . . cntL+cntT−1, and the down-sampled neighbouring top luma samples pSelDsY[idx] with idx=0 . . . cntL+cntT−1 are specified as follows:
The variable x is set equal to pickPosT[idx−cntL].
If both SubWidthC and SubHeightC are equal to 1, the following applies:

$$pSelDsY[idx]=pY[x][1] \quad (8\text{-}181)$$

Otherwise, the following applies:
If sps_cclm_colocated_chroma_flag is equal to 1, the following applies:
If x is greater than 0, the following applies:
If bCTUboundary is equal to FALSE, the following applies:

$$pSelDsY[idx]=(F3[1][0]*pY[SubWidthC*x][-1-SubHeightC]+F3[0][1]*pY[SubWidthC*x-1][-SubHeightC]+F3[1][1]*pY[SubWidthC*x][-SubHeightC]+F3[2][1]*pY[SubWidthC*x+1][-SubHeightC]+F3[1][2]*pY[SubWidthC*x][-1-SubHeightC]+4)>>3 \quad (8\text{-}182)$$

Otherwise (bCTUboundary is equal to TRUE), the following applies:

$$pSelDsY[idx]=(F2[0]*pY[SubWidthC*x-1][-1]+F2[1]*pY[SubWidthC*x][-1]+F2[2]*pY[SubWidthC*x+1][-1]+2)>>2 \quad (8\text{-}183)$$

Otherwise (x is equal to 0), the following applies:
If availTL is equal to TRUE and bCTUboundary is equal to FALSE, the following applies:

$$pSelDsY[idx]=(F3[1][0]*pY[1][-1-SubHeightC]+F3[0][1]*pY[-1][-SubHeightC]+F3[1][1]*pY[0][-SubHeightC]+F3[2][1]*pY[1][-SubHeightC]+F3[1][2]*pY[-1][-1-SubHeightC]+4)>>3 \quad (8\text{-}184)$$

Otherwise if availTL is equal to TRUE and bCTUboundary is equal to TRUE, the following applies:

$$pSelDsY[idx]=(F2[0]*pY[-1][-1]+F2[1]*pY[0][-1]+F2[2]*pY[1][-1]+2)>>2 \quad (8\text{-}185)$$

Otherwise if availTL is equal to FALSE and bCTUboundary is equal to FALSE, the following applies:

$$pSelDsY[idx]=(F2[0]*pY[0][-1]+F2[1]*pY[0][-2]+F2[2]*pY[0][-1]+2)>>2 \quad (8\text{-}186)$$

Otherwise (availTL is equal to FALSE and bCTUboundary is equal to TRUE), the following applies:

$$pSelDsY[idx]=pY[0][-1] \quad (8\text{-}187)$$

Otherwise (sps_cclm_colocated_chroma_flag is equal to 0), the following applies:
If x is greater than 0, the following applies:
If bCTUboundary is equal to FALSE, the following applies:

$$pSelDsY[idx]=(F4[0][1]*pY[SubWidthC*x-1][-2]+F4[0][2]*pY[SubWidthC*x-1][-1]+F4[1][1]*pY[SubWidthC*x][-2]+F4[1][2]*pY[SubWidthC*x][-1]+F4[2][1]*pY[SubWidthC*x+1][-2]+F4[2][2]*pY[SubWidthC*x+1][-1]+4)>>3 \quad (8\text{-}188)$$

Otherwise (bCTUboundary is equal to TRUE), the following applies:

$pSelDsY[idx]=(F2[0]*pY[SubWidthC*x-1][-1]+F2[1]*pY[SubWidthC*x][-1]+F2[2]*pY[SubWidthC*x+1][-1]+2)>>2$ (8-189)

Otherwise (x is equal to 0), the following applies:
If availTL is equal to TRUE and bCTUboundary is equal to FALSE, the following applies:

$pSelDsY[idx]=(F4[0][1]*pY[-1][-2]+F4[0][2]*pY[-1][-1]+F4[1][1]*pY[0][-2]+F4[1][2]*pY[0][-1]+F4[2][1]*pY[1][-2]+F4[2][2]*pY[1][-1]+4)>>3$ (8-190)

Otherwise if availTL is equal to TRUE and bCTUboundary is equal to TRUE, the following applies:

$pSelDsY[idx]=(F2[0]*pY[-1][-1]+F2[1]*pY[0][-1]+F2[2]*pY[1][-1]+2)>>2$ (8-191)

Otherwise if availTL is equal to FALSE and bCTUboundary is equal to FALSE, the following applies:

$pSelDsY[idx]=(F1[1]*pY[0][-2]+F1[0]*pY[0][-1]+1)>>1$ (8-192)

Otherwise (availTL is equal to FALSE and bCTUboundary is equal to TRUE), the following applies:

$pSelDsY[idx]=pY[0][-1]$ (8-193)

6. When cntT+ cntL is not equal to 0, the variables minY, maxY, minC and maxC are derived as follows:
When cntT+cntL is equal to 2, pSelComp[3] is set equal to pSelComp[0], pSelComp[2] is set equal to pSelComp[1], pSelComp[0] is set equal to pSelComp[1], and pSelComp[1] is set equal to pSelComp[3], with Comp being replaced by DsY and C. The arrays minGrpIdx and maxGrpIdx are derived as follows:

minGrpIdx[0]=0 (8-194)

minGrpIdx[1]=2 (8-195)

maxGrpIdx[0]=1 (8-196)

maxGrpIdx[1]=3 (8-197)

When pSelDsY[minGrpIdx[0] ] is greater than pSelDsY[minGrpIdx[1] ], minGrpIdx[0] and minGrpIdx[1] are swapped as follows:

(minGrpIdx[0],minGrpIdx[1])=Swap(minGrpIdx[0], minGrpIdx[1]) (8-198)

When pSelDsY[maxGrpIdx[0] ] is greater than pSelDsY[maxGrpIdx[1] ], maxGrpIdx[0] and maxGrpIdx[1] are swapped as follows:

(maxGrpIdx[0],maxGrpIdx[1])=Swap(maxGrpIdx[0], maxGrpIdx[1]) (8-199)

When pSelDsY[minGrpIdx[0] ] is greater than pSelDsY[maxGrpIdx[1] ], arrays minGrpIdx and maxGrpIdx are swapped as follows:

(minGrpIdx,maxGrpIdx)=Swap(minGrpIdx, maxGrpIdx) (8-200)

When pSelDsY[minGrpIdx[1] ] is greater than pSelDsY[maxGrpIdx[0] ], minGrpIdx[1] and maxGrpIdx[0] are swapped as follows:

(minGrpIdx[1],maxGrpIdx[0])=Swap(minGrpIdx[1], maxGrpIdx[0]) (8-201)

The variables maxY, maxC, minY and minC are derived as follows:

max $Y=(pSelDsY[maxGrpIdx[0]]+pSelDsY[maxGrpIdx[1]]+1)>>1$ (8-202)

max $C=(pSelC[maxGrpIdx[0]]+pSelC[maxGrpIdx[1]]+1)>>1$ (8-203)

min $Y=(pSelDsY[minGrpIdx[0]]+pSelDsY[minGrpIdx[1]]+1)>>1$ (8-204)

min $C=(pSelC[minGrpIdx[0]]+pSelC[minGrpIdx[1]]+1)>>1$ (8-205)

7. The variables a, b, and k are derived as follows:
If numSampL is equal to 0, and numSampT is equal to 0, the following applies:

$k=0$ (8-206)

$a=0$ (8-207)

$b=1<<(BitDepth_c-1)$ (8-208)

Otherwise, the following applies:

$diff=maxY-minY$ (8-209)

If diff is not equal to 0, the following applies:

$diffC=\max C-\min C$ (8-210)

$x=Floor(Log 2(diff))$ (8-211)

$normDiff=((diff<<4)>>x)\&15$ (8-212)

$x+=(normDiff!=0)?1:0$ (8-213)

$y=Floor(Log 2(Abs(diffC)))+1$ (8-214)

$a=(diffC*(divSigTable[normDiff]|8)+2^{y-1})>>y$ (8-215)

$k=((3+x-y)<1)?1:3+x-y$ (8-216)

$a=((3+x-y)<1)?Sign(a)*15: a$ (8-217)

$b=minC-((a*minY)>>k)$ (8-218)

where divSigTable[ ] is specified as follows:

divSigTable[ ]={0,7,6,5,5,4,4,3,3,2,2,1,1,1,1,0} (8-219)

Otherwise (diff is equal to 0), the following applies:

$k=0$ (8-220)

$a=0$ (8-221)

$b=\min C$ (8-222)

8. The prediction samples predSamples[x][y] with x=0 . . . nTbW−1, y=0 . . . nTbH−1 are derived as follows:

$predSamples[x][y]=Clip1C(((pDsY[x][y]*a)>>k)+b)$ (8-223)

A video coder (e.g., video encoder 200 or video decoder 300) may apply single-tree or dual tree partitioning in VVC. Some examples of VVC define two different types of CTU partitioning for luma and chroma components. When applying single-tree, the video coder may align chroma partitioning to luma partitioning. In 4:2:0 coding mode, aligning chroma partitioning to luma means that chroma resolution is ½ luma resolution in both width and height. When applying dual tree partitioning, the video coder may partition luma and chroma differently (e.g., luma and chroma blocks may be partitioned independently). Because the dual tree in intra picture allows application of different partitioning in the chroma coding tree compared to the luma coding tree, the video coder may generate the dual tree to introduce a longer coding pipeline. Additionally, dual tree may and the QTBT MinQTSizeC value range and MinBtSizeY and MinTTSizeY in the chroma tree may allow small chroma blocks, such as 2×2, 4×2, and 2×4, which may provide difficulties in implementing the video coder. Moreover, several prediction modes, such as CCLM, planar and angular mode use multiplication. In order to alleviate the above-mentioned, some video coders may restrict small chroma block sizes (2×2/2×4/4×2) in dual tree as a partitioning restriction.

As described above, when a video coder (e.g., video encoder 200 or video decoder 300) may apply CCLM mode, the video coder may directly predict samples based on collocated reconstructed luma samples. In both dual-tree and single-tree cases, this may lead to latency issues because the video coder may wait for the reconstruction of a complete collocated luma area to start chroma reconstruction. In addition, when applying the CCLM process, the video coder may use down-sampling of luma reconstructed area for prediction, which involves more processing stages and computational resources.

The description above demonstrates that both MIP and CCLM use down-sampling process on luma neighboring samples. In the VVC Draft 5, a video coder (e.g., video encoder 200 or video decoder 300) may be configured to use MIP and CCLM with different down-sampling processes to achieve this down-sampling operation, which may lead to increased complexity in the video coder.

In view of the foregoing, this disclosure proposes the followings techniques. The techniques described below may be applied independently, or one or more techniques may be applicable together in any combination.

A video coder (e.g., video encoder 200 or video decoder 300) may be configured to perform CCLM Model Estimation using MIP down-sampling. That is, the video coder may be configured to predict chroma samples for the block using CCLM prediction that uses down-sampled luma neighboring samples generated using MIP down-sampling.

As described herein, when performing CCLM, the video coder may compute linear model parameters (e.g., $\alpha$ and $\beta$). In compliance with the VVC specification, the video coder may compute these parameters based on at most four neighbouring chroma samples and their corresponding down-sampled luma samples. Besides CCLM prediction, this disclosure describes MIP, which may also use a down-sampling operation of luma neighbouring samples.

In accordance with techniques of this disclosure, a video coder (e.g., video encoder 200 and video decoder 300) may be configured to harmonize both MIP and CCLM down-sampling. That is, the video coder may be configured to apply a down-sampling technique used for MIP to down-sample a set of luma neighboring samples used for MIP and to apply the down-sampling technique used for MIP to down-sample a set of luma neighboring samples used for CCLM prediction. In some examples, the video coder may apply CCLM prediction to predict chroma samples for a block using the down-sampled luma neighboring samples used for MIP. For instance, the video coder may use the down-sampled neighboring samples used in MIP prediction to derive CCLM parameters, which are used to predict the chroma samples.

For example, a video coder (video encoder 200 or video decoder 300) may be configured to predict luma samples for a block of the video data using MIP. In this example, to use MIP, the video coder may be configured to down-sample a set of luma neighboring samples to generate down-sampled luma neighboring samples. The video coder may predict chroma samples for the block using CCLM prediction. To use CCLM prediction, the video coder may be configured to predict the chroma samples for the block based on the down-sampled luma neighboring samples. For example, when a block is to be encoded or decoded in single-tree and the down-sampling factor in CCLM prediction and MIP are identical, the video coder may use the down-sampled neighboring samples used in MIP prediction to derive CCLM parameters (e.g., an $\alpha$ parameter and a $\beta$ parameter). In this example, the video coder may predict the chroma samples for the block using the CCLM parameters. One benefit is that video decoder 300 would only use a single down-sampling routine for both tools instead of two. Another benefit is that in the case where MIP mode is used in luma with single-tree partitioning, CCLM parameters can be calculated at the same time as the luma reduced boundary.

In an example, an implementation of the above techniques into VVC may be accomplished with the following changes to the VVC Draft 5 specification. Additions are shown in with in bold and with +++, while deletions are shown with ***.

4. +++When numSampL is greater than 0, the downsampling function defines in 8.4.5.2.3 is invoked as follows:
   Input:
     nTbs=SubHeightC*numSampL
     refS=pY[−SubWidthC][y], with y=0 . . . nTbs
     boundarySize=numSampL
     needUpsBdry=0
   Output:
     pDsYL[y], x=0 . . . numSampL−1+++

Where SubHeightC is predetermined based on a chroma format sampling structure, numSampL is a number of left luma samples of a set of luma neighboring samples, pY[x][y] is the luma sample at a horizontal position 'x' and a vertical position 'y', SubWidthC is predetermined based on a chroma format sampling structure, and pDsYL[y] is the down-sampled luma neighboring samples, for example, a down-sampled line of neighboring boundary samples left of a block.

5. +++When numSampT is greater than 0, the downsampling function defines in 8.4.5.2.3 is invoked as follows:
   Input:
     nTbs=SubWidthC*numSampT
     refS=pY[x][−SubHeightC], with x=0 . . . nTbs
     boundarySize=numSampT
     needUpsBdry=0
   Output:
     pDsYT[x], x=0 . . . numSampT−1+++

Where SubHeightT is predetermined based on a chroma format sampling structure, numSampT is a number of top luma samples of a set of luma neighboring samples, pY[x][y] is the luma sample at a horizontal position 'x' and a vertical position 'y', SubWidthC is predetermined based on a chroma format sampling structure, and pDsYT[y] is the down-sampled luma neighboring samples, for example, a down-sampled line of neighboring boundary samples above a block.

6. When numSampL is greater than 0, the selected neighbouring left chroma samples pSelC[idx] are set equal to p[−1][pickPosL[idx]] with idx=0 . . . cntL−1, and the selected down-sampled neighbouring left luma samples pSelDsY[idx] with idx=0 . . . cntL−1 are derived as follows:
   The variable y is set equal to pickPosL[idx].
   If both SubWidthC and SubHeightC are equal to 1, the following applies:

$pSelDsY[idx]=pY[−1][y]$ (8-177)

Otherwise the following applies:

+++$pSelDsY[idx]=pDsYL[y]$+++

That is, when no down-sampling is not used (e.g., 4:4:4 format), a video coder (e.g., video encoder 200 or video decoder 300) may use left luma samples that are not down-sampled. When down-sampling is used, the video coder may use left down-sampled luma values.

\*\*If sps_cclm_colocated_chroma_flag is equal to 1, the following applies:

If y is greater than 0 or availTL is equal to TRUE, pSelDsY[idx] is derived as follows:

$pSelDsY[idx]=(F3[1][0]*pY[-SubWidthC]$
$[SubHeightC*y-1]+F3[0][1]*pY[-1-Sub-$
$WidthC][SubHeightC*y]+F3[1][1]*pY[-Sub-$
$WidthC][SubHeightC*y]+F3[2][1]*pY[-1-$
$SubWidthC][SubHeightC*y]+F3[1][2]*pY[-$
$SubWidthC][SubHeightC*y+1]+4)>>3$  (8-178)

Otherwise (y is equal to 0), pSelDsY[idx] is derived as follows:

$pSelDsY[idx]=(F2[0]*pY[-1-SubWidthC][0]+F2[1]$
$*pY[-SubWidthC][0]+F2[2]*pY[-1-Sub-$
$WidthC][0]+2)>>2$  (8-179)

Otherwise (sps_cclm_colocated_chroma_flag is equal to 0), the following applies:

$pSelDsY[idx]=(F4[0][1]*pY[-1-SubWidthC]$
$[SubHeightC*y]+F4[0][2]*pY[-1-SubWidthC]$
$[SubHeightC*y+1]+F4[1][1]*pY[-SubWidthC]$
$[SubHeightC*y]+F4[1][2]*pY[-SubWidthC]$
$[SubHeightC*y+1]+F4[2][1]*pY[-1-$
$SubWidthC][SubHeightC*y]+F4[2][2]*pY[-1-$
$SubWidthC][SubHeightC*y+1]+4)>>3$\*\*\*  (8-180)

7. When numSampT is greater than 0, the selected neighbouring top chroma samples pSelC[idx] are set equal to p[pickPosT[idx−cntL]][−1] with idx=cntL . . . cntL+ cntT−1, and the down-sampled neighbouring top luma samples pSelDsY[idx] with +++idx=cntL . . . cntL+ cntT−1+++ are specified as follows:

The variable x is set equal to pickPosT[idx−cntL].

If both SubWidthC and SubHeightC are equal to 1, the following applies:

$pSelDsY[idx]=pY[x][1]$  (8-181)

Otherwise, the following applies:

+++$pSelDsY[idx]=pDsYT[y]$+++

That is, when no down-sampling is not used (e.g., 4:4:4 format), a video coder (e.g., video encoder 200 or video decoder 300) may use top luma samples that are not down-sampled. When down-sampling is used, the video coder may use top down-sampled luma values.

\*\*If sps_cclm_colocated_chroma_flag is equal to 1, the following applies:

If x is greater than 0, the following applies:

If bCTUboundary is equal to FALSE, the following applies:

$pSelDsY[idx]=(F3[1][0]*pY[SubWidthC*x][-1-Sub-$
$HeightC]+F3[0][1]*pY[SubWidthC*x-1][-Sub-$
$HeightC]+F3[1][1]*pY[SubWidthC*x][-Sub-$
$HeightC]+F3[2][1]*pY[SubWidthC*x+1][-$
$SubHeightC]+F3[1][2]*pY[SubWidthC*x][-$
$SubHeightC]+4)>>3$  (8-182)

Otherwise (bCTUboundary is equal to TRUE), the following applies:

$pSelDsY[idx]=(F2[0]*pY[SubWidthC*x-1][-1]+F2$
$[1]*pY[SubWidthC*x][-1]+F2[2]*pY$
$[SubWidthC*x+1][-1]+2)>>2$  (8-183)

Otherwise (x is equal to 0), the following applies:

If availTL is equal to TRUE and bCTUboundary is equal to FALSE, the following applies:

$pSelDsY[idx]=(F3[1][0]*pY[-1][-1-SubHeightC]+F3$
$[0][1]*pY[-1][-SubHeightC]+F3[1][1]*pY[0][-$
$SubHeightC]+F3[2][1]*pY[1][-SubHeightC]+F3$
$[1][2]*pY[-1][1-SubHeightC]+4)>>3$  (8-184)

Otherwise if availTL is equal to TRUE and bCTUboundary is equal to TRUE, the following applies:

$pSelDsY[idx]=(F2[0]*pY[-1][-1]+F2[1]*pY[0][-1]+$
$F2[2]*pY[1][-1]+2)>>2$  (8-185)

Otherwise if availTL is equal to FALSE and bCTUboundary is equal to FALSE, the following applies:

$pSelDsY[idx]=(F2[0]*pY[0][-1]+F2[1]*pY[0][-2]+F2$
$[2]*pY[0][-1]+2)>>2$  (8-186)

Otherwise (availTL is equal to FALSE and bCTUboundary is equal to TRUE), the following applies:

$pSelDsY[idx]=pY[0][-1]$  (8-187)

Otherwise (sps_cclm_colocated_chroma_flag is equal to 0), the following applies:

If x is greater than 0, the following applies:

If bCTUboundary is equal to FALSE, the following applies:

$pSelDsY[idx]=(F4[0][1]*pY[SubWidthC*x-1][-2]+$
$F4[0][2]*pY[SubWidthC*x-1][-1]+F4[1][1]*pY$
$[SubWidthC*x][-2]+F4[1][2]*pY[SubWidthC*x]$
$[-1]+F4[2][1]*pY[SubWidthC*x+1][-2]+F4[2]$
$[2]*pY[SubWidthC*x+1][-1]+4)>>3$  (8-188)

Otherwise (bCTUboundary is equal to TRUE), the following applies:

$pSelDsY[idx]=(F2[0]*pY[SubWidthC*x-1][-1]+F2$
$[1]*pY[SubWidthC*x][-1]+F2[2]*pY$
$[SubWidthC*x+1][-1]+2)>>2$  (8-189)

Otherwise (x is equal to 0), the following applies:

If availTL is equal to TRUE and bCTUboundary is equal to FALSE, the following applies:

$pSelDsY[idx]=(F4[0][1]*pY[-1][-2]+F4[0][2]*pY[-$
$1][-1]+F4[1][1]*pY[0][-2]+F4[1][2]*pY[0][-$
$1]+F4[2][1]*pY[1][-2]+F4[2][2]*pY[1][-1]+$
$4)>>3$  (8-190)

Otherwise if availTL is equal to TRUE and bCTUboundary is equal to TRUE, the following applies:

$pSelDsY[idx]=(F2[0]*pY[-1][-1]+F2[1]*pY[0][-1]+$
$F2[2]*pY[1][-1]+2)>>2$  (8-191)

Otherwise if availTL is equal to FALSE and bCTUboundary is equal to FALSE, the following applies:

$pSelDsY[idx]=(F1[1]*pY[0][-2]+F1[0]*pY[0][-1]+$
$1)>>1$  (8-192)

Otherwise (availTL is equal to FALSE and bCTUboundary is equal to TRUE), the following applies:

$pSelDsY[idx]=pY[0][-1]$  (8-193)\*\*\*

8. When cntT+cntL is not equal to 0, the variables minY, maxY, minC and maxC are derived as follows:

When cntT+cntL is equal to 2, pSelComp[3] is set equal to pSelComp[0], pSelComp[2] is set equal to pSelComp[1], pSelComp[0] is set equal to pSel- Comp[1], and pSelComp[1] is set equal to pSelComp[3], with Comp being replaced by DsY and C.

That is, a video coder (e.g., video encoder 200 or video decoder 300) may determine a maximum sample and a minimum sample to be used to calculate CCLM parameters.

A video coder (e.g., video encoder 200 or video decoder 300) may remove a CCLM down sampling process that involves up to 6-tap filters (see equations 8-178 through 8-180 and 8-182 through 8-193) and instead perform an invocation of MIP's clause on downsampling (see sections 4 and 5, which invoke the downsampling function defined in 8.4.5.2.3 of VVC Draft 5). For example, the video coder may perform a down-sampling technique for MIP that applies a 2-tap filter, a 4-tap filter, an 8-tap filter, a 16-tap filter, or another filter for performing down-sampling processes in both MIP and in CCLM prediction.

The techniques of this disclosure may be adapted to improve CCLM model estimation, providing more accurate alignment of downsampled luma samples with chroma samples. FIG. 9 illustrates types of chroma locations (e.g., position of chroma samples for a 4:2:0 chroma sub-sampling format) and techniques for grouping luma samples to align downsampled luma samples with chroma samples.

As shown in FIG. 9, if type-0 content is used, a video coder (e.g., video encoder 200 and video decoder 300) may perform the MIP averaging by grouping two vertically aligned luma samples. For example, the video coder may use bottom/top luma fields (e.g., samples 400 and 402). In the case of a top CTU boundary, for the above reference, the video coder may use vertically aligned luma samples on the bottom field.

As shown in FIG. 9, if type-1 content is used, a video coder (e.g., video encoder 200 or video decoder 300) may perform the MIP averaging by grouping four luma samples. For example, the video coder may use bottom/top luma fields (e.g., luma samples 400, 402, 404, and 406). In the case of a top CTU boundary, for the above reference, the video coder may perform the averaging by grouping two horizontally aligned luma samples. For example, the video coder may use the bottom luma field (e.g. samples 402 and 406).

As shown in FIG. 9, if type-2 content is used, a video coder (e.g., video encoder 200 and video decoder 300) may use the collocated luma pixel on the top field, and the video coder may not perform averaging.

As shown in FIG. 9, if type-3 content is used, a video coder (e.g., video encoder 200 or video decoder 300) may perform the MIP averaging by grouping horizontally aligned luma samples. For example, the video coder may use the top luma field (e.g., samples 400 and 404). In the case of a top CTU boundary, for the above reference, the video coder may perform the averaging by grouping two horizontally aligned luma samples. For example, the video coder may use the bottom luma field (e.g., samples 402 and 406).

As shown in FIG. 9, if type-4 content is used, a video coder (e.g., video encoder 200 or video decoder 300) may use the collocated luma pixel on the bottom field, and the video coder may not perform averaging.

As shown in FIG. 9, if type-5 content is used, a video coder (e.g., video encoder 200 and video decoder 300) may perform the MIP averaging by grouping two horizontally aligned luma samples. For example, the video coder may use the bottom luma field (e.g., samples 402 and 406).

A video coder (e.g., video encoder 200 or video decoder 300) may perform low-latency CCLM reconstruction with MIP. As discussed above, CCLM prediction may introduce both latency and additional processing stages during the reconstruction stage. In the single-tree partitioning case, and when MIP is the collocated luma mode, both latency and processing issues can be addressed by the techniques of this disclosure.

As noted above, MIP may achieves prediction on a low-resolution domain, then the low-resolution prediction is up-sampled using linear interpolation to fill empty samples and obtain a complete full-resolution prediction. In accordance with techniques of this disclosure, a video coder (e.g., video encoder 200 and video decoder 300) may be configured perform CCLM prediction on low-resolution MIP prediction when the MIP mode is used in the collocated luma block. As linear interpolation may preserve low-resolution pixels values, the video coder may add a luma residual value at the same position and the CCLM prediction can be computed at the same time, reducing CCLM reconstruction latency.

An implementation of the above technique be achieved as follows. For example, this implementation enables CCLM prediction with no more than 32×32 luma sample reconstruction latency in the case of a 64×64 collocated luma block. In that case, CCLM prediction can be achieved based on a low-resolution MIP predictor. This is illustrated in FIG. 10.

Figure 10:
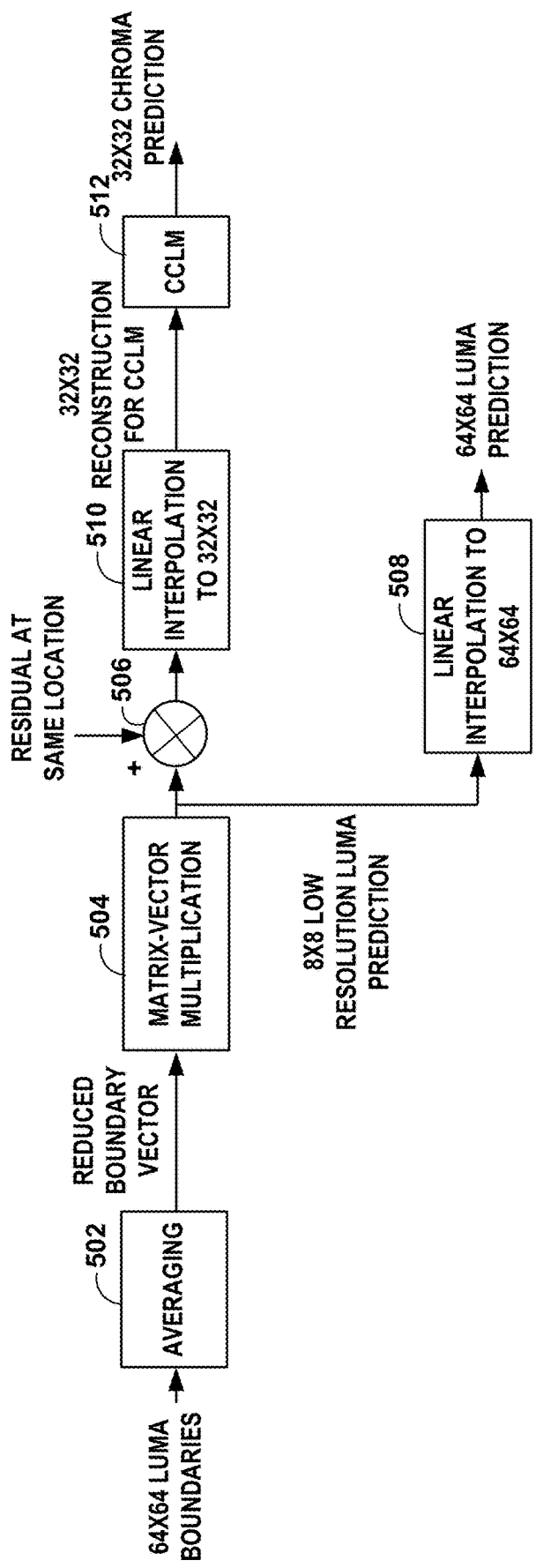
FIG. 10 is a flowchart illustrating low-latency cross-component linear prediction reconstruction with matrix intra prediction for a 64×64 block.

In FIG. 10, the legacy MIP path includes averaging 502, matrix-vector multiplication 504 and linear interpolation 508 to 64×64. A video coder (e.g., video encoder 200 or video decoder 300) may average (e.g., averaging 502) luma block boundaries to generate a reduced boundary vector (e.g., down-sampled luma neighboring samples). The video coder may use the reduced boundary vector (e.g., down-sampled luma neighboring samples) at matrix-vector multiplication 504 to output a low-resolution prediction (e.g., a reduced prediction block). The video coder may apply linear interposition to 32×32 510 to generate the output full resolution luma prediction that can be used in CCLM prediction 512.

As shown in the example of FIG. 10, an adder 506, linear interpolation to 32×32 510, and CCLM 512 to the MIP process. A video coder (e.g., video encoder 200 or video decoder 300) adds residual samples located at the same position as the low-resolution luma predictor. The video coder may perform a 32×32 linear interpolation 510 to generate a 32×32 reconstruction that can be used in the CCLM prediction 512. At the output, the 32×32 chroma prediction is achieved while respecting 32×32 luma reconstruction latency. In another example, the implementation shown in FIG. 10 can be used for all luma block sizes.

Figure 11:
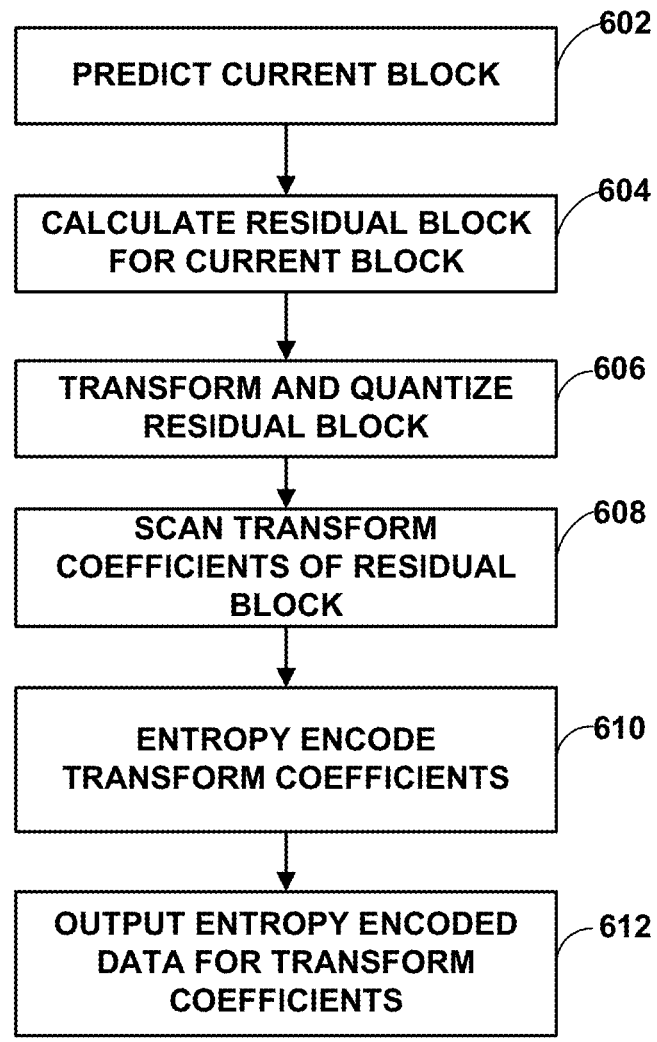
FIG. 11 is a flowchart illustrating an example encoding method of the disclosure.

FIG. 11 is a flowchart illustrating an example method for encoding a current block. The current block may comprise a current CU. Although described with respect to video encoder 200 (FIGS. 1 and 2), other devices may be configured to perform a method similar to that of FIG. 11.

In this example, video encoder 200 initially predicts the current block (602). For example, video encoder 200 may form a prediction block for the current block using MIP and CCLM. Video encoder 200 may then calculate a residual block for the current block (604). To calculate the residual block, video encoder 200 may calculate a difference between the original, unencoded block and the prediction block for the current block. Video encoder 200 may then transform and quantize coefficients of the residual block (606). Next, video encoder 200 may scan the quantized transform coefficients of the residual block (608). During the scan, or following the scan, video encoder 200 may entropy encode the transform coefficients (610). For example, video encoder 200 may encode the transform coefficients using CAVLC or CABAC. Video encoder 200 may then output the entropy encoded data of the block (612).

Figure 12:
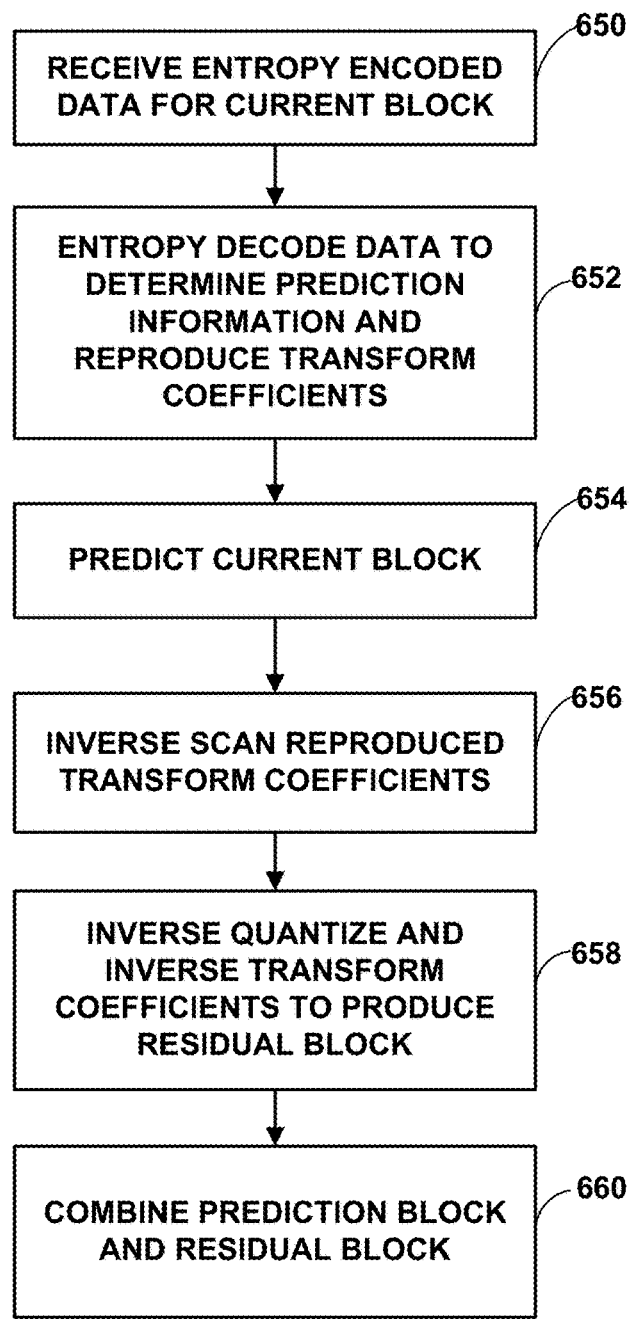
FIG. 12 is a flowchart illustrating an example decoding method of the disclosure.

FIG. 12 is a flowchart illustrating an example method for decoding a current block of video data. The current block may comprise a current CU. Although described with respect to video decoder 300 (FIGS. 1 and 3), other devices may be configured to perform a method similar to that of FIG. 12.

Video decoder 300 may receive entropy encoded data for the current block, such as entropy coded prediction information and entropy encoded data for coefficients of a residual block corresponding to the current block (650). Video decoder 300 may entropy decode the entropy encoded data to determine prediction information for the current block and to reproduce coefficients of the residual block (652). Video decoder 300 may predict the current block (654), e.g., using an intra- or inter-prediction mode as indicated by the prediction information for the current block, to calculate a prediction block for the current block. For example, video decoder 300 may form a prediction block for the current block using MIP and CCLM. Video decoder 300 may then inverse scan the reproduced coefficients (656), to create a block of quantized transform coefficients. Video decoder 300 may then inverse quantize and inverse transform the transform coefficients to produce a residual block (658). Video decoder 300 may ultimately decode the current block by combining the prediction block and the residual block (660).

Figure 13:
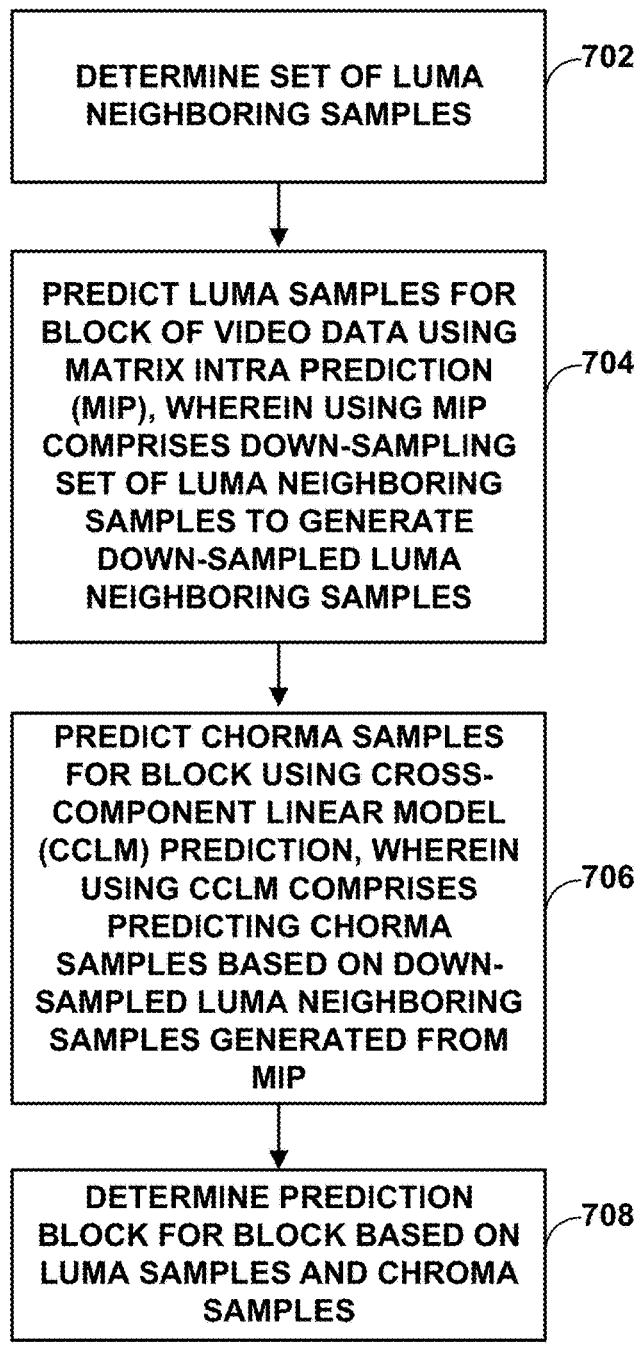
FIG. 13 is a flowchart illustrating an example of processing video data using MIP and CCLM prediction, in accordance with techniques described herein.

FIG. 13 is a flowchart illustrating an example of processing video data using MIP and CCLM prediction, in accordance with techniques described herein. The current block may comprise a current CU. Although described with respect to video encoder 200 (FIGS. 1 and 2) and video decoder 300 (FIGS. 1 and 3), other devices may be configured to perform a method similar to that of FIG. 13.

A video coder (e.g., video encoder 200, video decoder 300, or more specifically, for example, MIP unit 223 of video encoder 200 or MIP unit 315 of video decoder 300) predicts luma samples for a block of the video data using MIP, wherein using MIP comprises down-sampling a set of luma neighboring samples to generate down-sampled luma neighboring samples (704). A video coder (e.g., video encoder 200, video decoder 300, or more specifically, for example, CCLM unit 225 of video encoder 200 or CCLM unit 317 of video decoder 300) predicts chroma samples for the block using CCLM prediction, wherein using CCLM prediction comprises predicting the chroma samples for the block based on the down-sampled luma neighboring samples generated from the MIP (706). For example, the video coder may use the down-sampled neighboring samples used in MIP prediction to derive CCLM parameters. In this example, the video coder may predict the chroma samples for the block based on the CCLM parameters. A video coder (e.g., video encoder 200, video decoder 300, or more specifically, for example, mode selection unit 202 of video encoder 200 or prediction processing unit 304 of video decoder 300) determines a prediction block for the block based on the luma samples and the chroma samples (708).

In examples where the video coder is a video encoder (e.g., video encoder 200), the video encoder, or more specifically, for example, residual generation unit 204 of video encoder 200, may generate a residual block for the block based on differences between the block and the prediction block and encode the residual block. In examples where the video coder is a video decoder (e.g., video decoder 300), the video decoder, or more specifically, for example, one or more of entropy decoding unit 302, inverse quantization unit 306, and inverse transform processing unit 308 of video encoder 200, decode a residual block for the block. The video decoder, or more specifically reconstruction unit 310 of video decoder 300, may combine the prediction block and the residual block to decode the block.

A non-limiting illustrative list of examples of the techniques of this disclosure is provided below.

Example 1. A method of coding video data, the method comprising: coding a first block of video data using matrix intra prediction (MIP), wherein MIP includes a down-sampling techniques used for down-sampling luma neighboring samples; and coding a second block of video data using cross-component linear model (CCLM) prediction, wherein CCLM prediction includes using the down-sampling technique of MIP.

Example 2. The method of example 1, further comprising: down-sampling luma samples; grouping the down-sampled luma samples based on a type of down-sampling filter used to down-sample the luma samples; and averaging the grouped down-sampled luma samples.

Example 3. A method of coding video data, the method comprising: coding a luma block of video data using matrix intra prediction (MIP), including producing a low resolution luma prediction; and coding a corresponding chroma block of video data using cross-component linear model (CCLM) prediction, wherein the low resolution luma prediction of MIP is used as an input for the CCLM prediction.

Example 4. The method of any of examples 1-3, wherein coding comprises decoding.

Example 5. The method of any of examples 1-4, wherein coding comprises encoding.

Example 6. A device for coding video data, the device comprising one or more means for performing the method of any of examples 1-5.

Example 7. The device of example 6, wherein the one or more means comprise one or more processors implemented in circuitry.

Example 8. The device of any of examples 6 and 7, further comprising a memory to store the video data.

Example 9. The device of any of examples 6-8, further comprising a display configured to display decoded video data.

Example 10. The device of any of examples 6-9, wherein the device comprises one or more of a camera, a computer, a mobile device, a broadcast receiver device, or a set-top box.

Example 11. The device of any of examples 6-10, wherein the device comprises a video decoder.

Example 12. The device of any of examples 6-11, wherein the device comprises a video encoder.

Example 13. A computer-readable storage medium having stored thereon instructions that, when executed, cause one or more processors to perform the method of any of examples 1-5.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
    predicting, by one or more processors implemented in circuitry, luma samples for a block of the video data using matrix intra prediction (MIP), wherein using MIP comprises down-sampling a set of luma neighboring samples to generate down-sampled luma neighboring samples;
    predicting, by the one or more processors, chroma samples for the block using cross-component linear model (CCLM) prediction, wherein using CCLM prediction comprises predicting the chroma samples for the block based on the down-sampled luma neighboring samples generated from the MIP;
    generating, by the one or more processors, a prediction block for the block based on the luma samples and the chroma samples;
    decoding, by the one or more processors, a residual block for the block; and
    combining, by the one or more processors, the prediction block and the residual block to decode the block.

2. The method of claim 1, comprising determining, by the one or more processors, the set of luma neighboring samples based on a first line of neighboring samples left of the block and a second line of neighboring samples above the block.

3. The method of claim 2, wherein down-sampling the set of luma neighboring samples comprises one or more of:
    averaging a plurality of luma neighboring samples of the first line; or
    averaging a plurality of luma neighboring samples of the second line.

4. The method of claim 1, wherein predicting the luma samples using MIP comprises applying a matrix vector multiplication to the down-sampled luma neighboring samples.

5. The method of claim 1, wherein predicting the chroma samples using CCLM prediction comprises:
    calculating CCLM parameters based on the down-sampled luma neighboring samples; and
    predicting the chroma samples based on the CCLM parameters and down-sampled reconstructed luma samples for the block.

6. The method of claim 1,
    wherein down-sampling the set of luma neighboring samples comprises applying a down-sampling technique used for MIP; and
    wherein predicting the chroma samples comprises applying the down-sampling technique used for MIP to down-sample reconstructed luma samples for the block.

7. A method of encoding video data, the method comprising:
    predicting, by one or more processors implemented in circuitry, luma samples for a block of the video data using matrix intra prediction (MIP), wherein using MIP comprises down-sampling a set of luma neighboring samples to generate down-sampled luma neighboring samples;
    predicting, by the one or more processors, chroma samples for the block using cross-component linear model (CCLM) prediction, wherein using CCLM prediction comprises predicting the chroma samples for the block based on the down-sampled luma neighboring samples generated from the MIP;

generating, by the one or more processors, a prediction block for the block based on the luma samples and the chroma samples;

generating, by the one or more processors, a residual block for the block based on differences between the block and the prediction block; and encoding, by the one or more processors, the residual block.

8. The method of claim 7, comprising determining, by the one or more processors, the set of luma neighboring samples based on a first line of neighboring samples left of the block and a second line of neighboring samples above the block.

9. The method of claim 8, wherein down-sampling the set of luma neighboring samples comprises one or more of:

averaging a plurality of luma neighboring samples of the first line; or averaging a plurality of luma neighboring samples of the second line.

10. The method of claim 7, wherein predicting the luma samples using MIP comprises applying a matrix vector multiplication to the down-sampled luma neighboring samples.

11. The method of claim 7, wherein predicting the chroma samples using CCLM prediction comprises:

calculating CCLM parameters based on the down-sampled luma neighboring samples; and predicting the chroma samples based on the CCLM parameters and down-sampled reconstructed luma samples for the block.

12. The method of claim 7, wherein down-sampling the set of luma neighboring samples comprises applying a down-sampling technique used for MIP; and wherein predicting the chroma samples comprises applying the down-sampling technique used for MIP to down-sample reconstructed luma samples for the block.

13. A device for decoding video data, the device comprising:

a memory configured to store the video data; and one or more processors implemented in circuitry and configured to:

predict luma samples for a block of the video data using matrix intra prediction (MIP), wherein, to predict the luma samples using MIP, the one or more processors are configured to down-sample a set of luma neighboring samples to generate down-sampled luma neighboring samples;

predict chroma samples for the block using cross-component linear model (CCLM) prediction, wherein, to predict the chroma samples using CCLM prediction, the one or more processors are configured to predict the chroma samples for the block based on the down-sampled luma neighboring samples generated from the MIP;

generate a prediction block for the block based on the luma samples and the chroma samples;

decode a residual block for the block; and combine the prediction block and the residual block to decode the block.

14. The device of claim 13, wherein the one or more processors are configured to determine the set of luma neighboring samples based on a first line of neighboring samples left of the block and a second line of neighboring samples above the block.

15. The device of claim 14, wherein, to down-sample the set of luma neighboring samples, the one or more processors are configured to:

average a plurality of luma neighboring samples of the first line; or average a plurality of luma neighboring samples of the second line.

16. The device of claim 13, wherein, to predict the luma samples using MIP, the one or more processors are configured to apply a matrix vector multiplication to the down-sampled luma neighboring samples.

17. The device of claim 13, wherein, to predict the chroma samples using CCLM prediction, the one or more processors are configured to:

calculate CCLM parameters based on the down-sampled luma neighboring samples; and predict the chroma samples based on the CCLM parameters and down-sampled reconstructed luma samples for the block.

18. The device of claim 13, comprising:

wherein, to down-sample the set of luma neighboring samples, the one or more processors are configured to apply a down-sampling technique used for MIP; and wherein, to predict the chroma samples, the one or more processors are configured to apply the down-sampling technique used for MIP to down-sample reconstructed luma samples for the block.

19. The device of claim 13, further comprising a display configured to display the block of the video data.

20. The device of claim 13, wherein the device comprises one or more of a camera, a computer, a mobile device, a broadcast receiver device, or a set-top box.

21. A device for encoding video data, the device comprising:

a memory configured to store video data; and one or more processors implemented in circuitry and configured to:

predict luma samples for a block of the video data using matrix intra prediction (MIP), wherein, to predict the luma samples using MIP, the one or more processors are configured to down-sample a set of luma neighboring samples to generate down-sampled luma neighboring samples;

predict chroma samples for the block using cross-component linear model (CCLM) prediction, wherein, to predict the chroma samples using CCLM prediction, the one or more processors are configured to predict the chroma samples for the block based on the down-sampled luma neighboring samples generated from the MIP;

generate a prediction block for the block based on the luma samples and the chroma samples;

generate a residual block for the block based on differences between the block and the prediction block; and encode the residual block.

22. The device of claim 21, wherein the one or more processors are configured to determine the set of luma neighboring samples based on a first line of neighboring samples left of the block and a second line of neighboring samples above the block.

23. The device of claim 22, wherein, to down-sample the set of luma neighboring samples, the one or more processors are configured to:

average a plurality of luma neighboring samples of the first line; or average a plurality of luma neighboring samples of the second line.

24. The device of claim 21, wherein, to predict the luma samples using MIP, the one or more processors are configured to apply a matrix vector multiplication to the down-sampled luma neighboring samples.

25. The device of claim 21, wherein, to predict the chroma samples using CCLM prediction, the one or more processors are configured to:
  calculate CCLM parameters based on the down-sampled luma neighboring samples; and
  predict the chroma samples based on the CCLM parameters and down-sampled reconstructed luma samples for the block.

26. The device of claim 21, comprising:
  wherein, to down-sample the set of luma neighboring samples, the one or more processors are configured to apply a down-sampling technique used for MIP; and
  wherein, to predict the chroma samples, the one or more processors are configured to apply the down-sampling technique used for MIP to down-sample reconstructed luma samples for the block.

* * * * *